US012039930B2

(12) United States Patent
Pyun et al.

(10) Patent No.: US 12,039,930 B2
(45) Date of Patent: Jul. 16, 2024

(54) DISPLAY DEVICE WITH OVERCURRENT PROTECTION FUNCTION

(71) Applicant: Samsung Display Co., Ltd., Yongin-Si (KR)

(72) Inventors: Kihyun Pyun, Gwangmyeong-si (KR); Min-Soo Choi, Hwaseong-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/104,468

(22) Filed: Feb. 1, 2023

(65) Prior Publication Data

US 2023/0317005 A1 Oct. 5, 2023

(30) Foreign Application Priority Data

Apr. 5, 2022 (KR) ........................ 10-2022-0042129

(51) Int. Cl.
*G09G 3/3233* (2016.01)
*G09G 3/20* (2006.01)

(52) U.S. Cl.
CPC ......... *G09G 3/3233* (2013.01); *G09G 3/2096* (2013.01); *G09G 2300/0819* (2013.01);
(Continued)

(58) Field of Classification Search
CPC ............... G09G 3/3233; G09G 3/2096; G09G 2300/0819; G09G 2300/0842; G09G 2310/08; G09G 2320/0276; G09G 2320/045; G09G 2330/028; G09G 3/32; G09G 2310/0251; G09G 2310/0262; G09G 2300/043; G09G 2320/0673;
(Continued)

(56) References Cited

U.S. PATENT DOCUMENTS 7,068,265 B2 6/2006 Kim
7,230,614 B2 6/2007 Kim et al.
(Continued)

FOREIGN PATENT DOCUMENTS

KR 10-0394006 8/2003
KR 10-0421869 3/2004
(Continued)

*Primary Examiner* — Stephen G Sherman
(74) *Attorney, Agent, or Firm* — F. Chau & Associates, LLC

(57) ABSTRACT

A display device including: a display panel; a current compensation circuit executing a current compensation operation in which a load is calculated based on input image data, and output compensation image data is generated by compensating for the input image data based on the load; a data driver converting the compensation image data into a data voltage based on a gamma reference voltage and a data driving voltage, and outputting the data voltage; a current sensing circuit sensing a driving current of the display panel and comparing the driving current with a preset reference current to output a protection signal; a voltage generator generating a driving voltage, the gamma reference voltage, and the data driving voltage; and a voltage control circuit generating a first voltage control signal to control a first target compensation value of the gamma reference voltage or the data driving voltage in response to the protection signal.

19 Claims, 14 Drawing Sheets

(52) U.S. Cl.
CPC . *G09G 2300/0842* (2013.01); *G09G 2310/08* (2013.01); *G09G 2320/0276* (2013.01); *G09G 2320/045* (2013.01); *G09G 2330/028* (2013.01)

(58) Field of Classification Search
CPC ..... G09G 2320/0271; G09G 2330/025; G09G 2330/045; G09G 2360/16
See application file for complete search history.

(56) References Cited

U.S. PATENT DOCUMENTS

| | | | | |
|---|---|---|---|---|
| 2015/0130690 | A1* | 5/2015 | Kim | G09G 3/3233<br>315/307 |
| 2018/0322844 | A1* | 11/2018 | Lee | G09G 5/10 |
| 2019/0340965 | A1* | 11/2019 | Chang | G09G 3/006 |
| 2020/0365091 | A1* | 11/2020 | Pyun | G09G 3/3283 |
| 2021/0043150 | A1* | 2/2021 | Lee | G09G 3/3291 |

FOREIGN PATENT DOCUMENTS

| | | |
|---|---|---|
| KR | 10-1177907 | 8/2012 |
| KR | 10-2055591 | 12/2019 |
| KR | 10-2239898 | 4/2021 |

* cited by examiner

DISPLAY DEVICE WITH OVERCURRENT PROTECTION FUNCTION

CROSS-REFERENCE TO RELATED APPLICATION

This U.S. non-provisional patent application claims priority under 35 U.S.C. § 119 to Korean Patent Application No. 10-2022-0042129, filed on Apr. 5, 2022, the disclosure of which is incorporated by reference herein in its entirety.

TECHNICAL FIELD

The present disclosure relates to a display device, and more particularly, to a display device with an enhanced protection function.

DISCUSSION OF RELATED ART

A display device is an output device for presentation of information in visual form, for example. An emissive display device displays an image with light emitting diodes that emit light through electron-hole recombination. Such an emissive display device has fast response speed and low power consumption.

The emissive display device includes pixels connected to data lines and scan lines. Each of the pixels typically includes a light emitting element and a pixel circuit for controlling an amount of current flowing to the light emitting element. In particular, the pixel circuit controls an amount of current flowing from a first driving voltage to a second driving voltage via the light emitting element in response to a data signal. In this case, light of a prescribed luminance is generated in correspondence to the amount of current flowing through the light emitting element.

SUMMARY

The present disclosure provides a display device for preventing a display panel from being damaged due to an overcurrent.

According to an embodiment of the inventive concept, a display device includes: a display panel including a pixel configured to receive a driving voltage and a data voltage; a current compensation circuit configured to execute a current compensation operation in which a load is calculated based on input image data, and output compensation image data is generated by compensating for the input image data based on the load; a data driver configured to convert the compensation image data into the data voltage based on a gamma reference voltage and a data driving voltage, and output the data voltage to the display panel; a current sensing circuit configured to sense a driving current of the display panel and compare the driving current with a preset reference current to output a protection signal; a voltage generator configured to generate the driving voltage, the gamma reference voltage, and the data driving voltage; and a voltage control circuit configured to generate a first voltage control signal for controlling a first target compensation value of at least one of the gamma reference voltage and the data driving voltage in response to the protection signal, and provide the first voltage control signal to the voltage generator.

BRIEF DESCRIPTION OF THE FIGURES

The above and other features of the inventive concept will become apparent by describing in detail embodiments thereof with reference to the accompanying drawings. In the drawings.

DETAILED DESCRIPTION OF THE EMBODIMENTS

Figure 1:
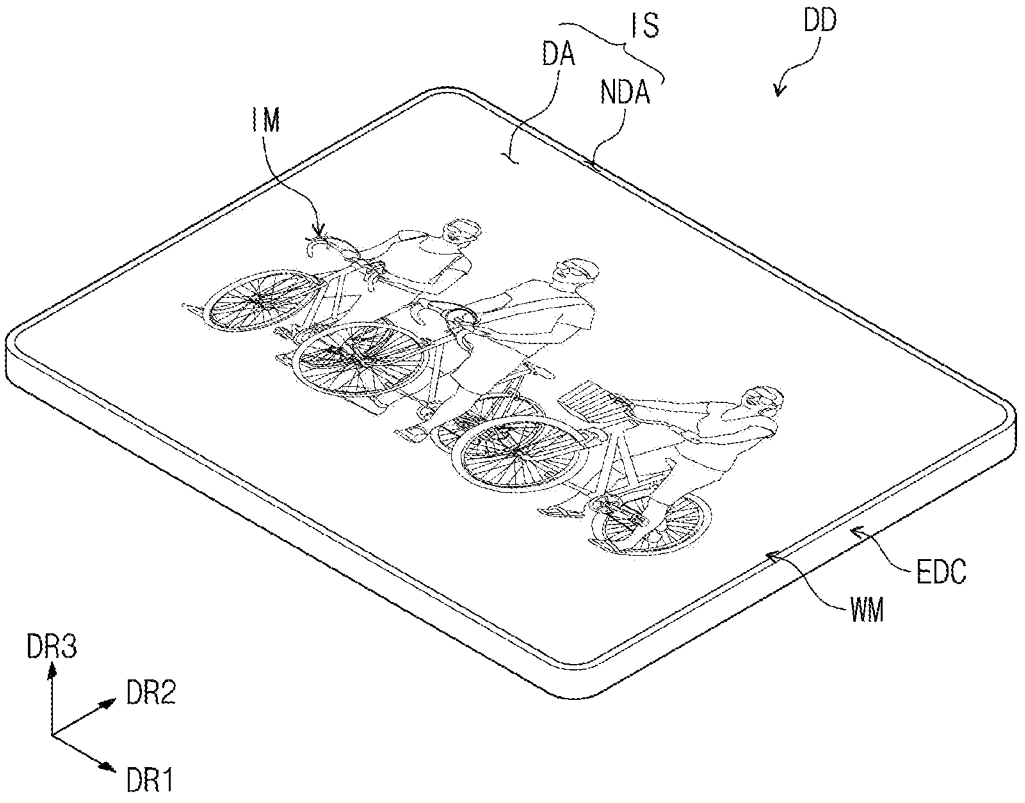
FIG. 1 is a perspective view of a display device according to an embodiment of the inventive concept.

It will be understood that when an element or layer is referred to as being "on", "connected to" or "coupled to" another element or layer, it can be directly on, connected or coupled to the other element or intervening third elements may be present.

Like reference numerals in the drawings may refer to like elements. In addition, in the drawings, the thicknesses, ratios and dimensions of the elements may be exaggerated for effective description of the technical contents. The term "and/or" includes any and all combinations of one or more of the associated items.

Terms such as first, second, and the like may be used to describe various components, but these components should not be limited by these terms. These terms are used to distinguish one element from another. For instance, a first component may be referred to as a second component, or similarly, a second component may be referred to as a first component. The singular expressions include plural expressions unless the context clearly dictates otherwise.

In addition, the terms such as "under", "lower", "on", and "upper" are used for explaining associations of items illustrated in the drawings. It will be understood that these spatially relative terms are intended to encompass different orientations of the device or element in use or operation in addition to the orientation depicted in the figures.

It will be further understood that the terms “includes” and/or “including”, when used in this specification, specify the presence of stated features, integers, steps, operations, elements, components or combinations thereof, but do not preclude the presence or addition of one or more other features, integers, steps, operations, elements, components, or combinations thereof.

Unless otherwise defined, all terms (including technical and scientific terms) used herein have the same meaning as commonly understood by one of ordinary skill in the art to which the inventive concept belongs. In addition, it will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, embodiments of the inventive concept will be described with reference to the accompanying drawings.

Figure 2:
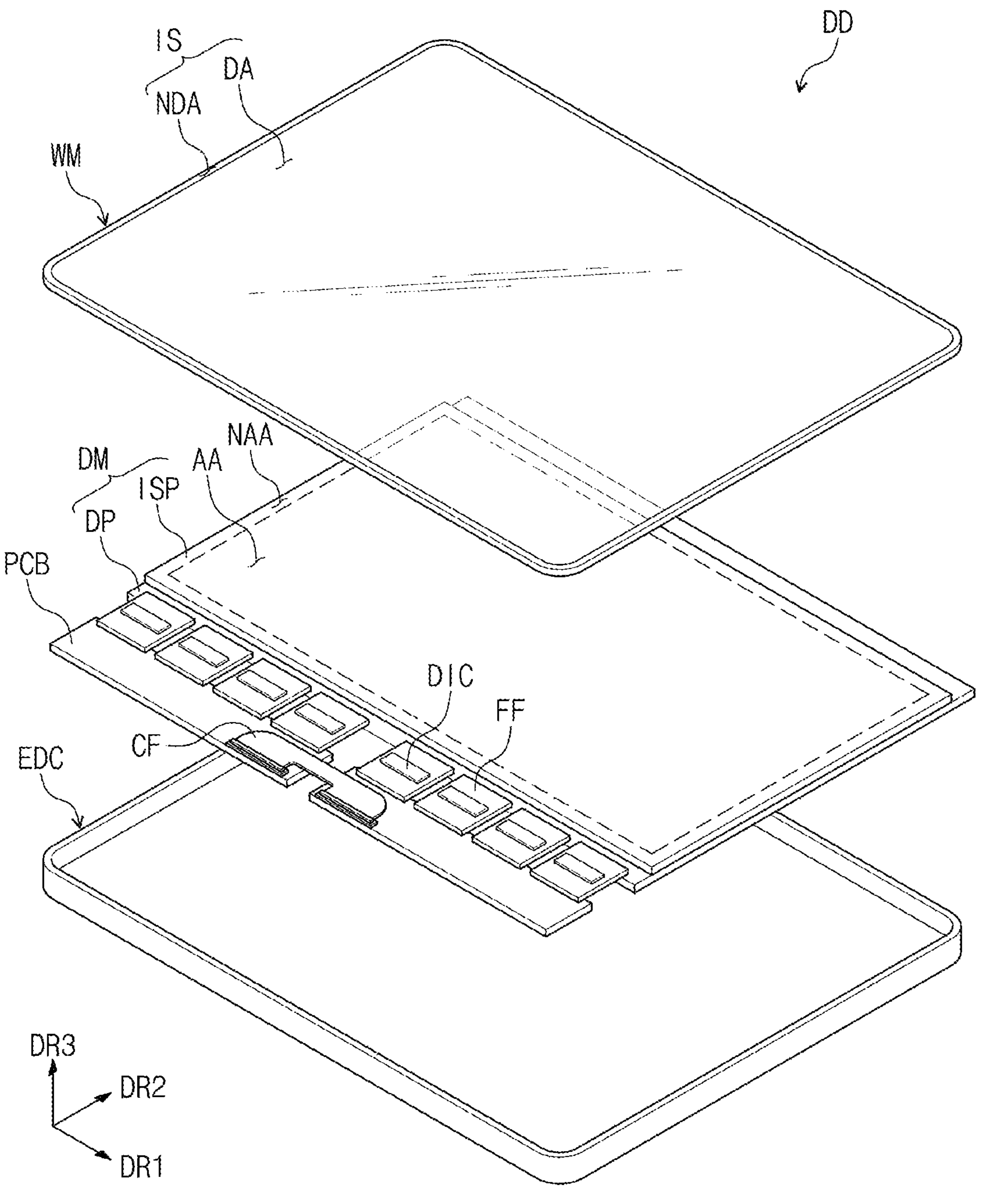
FIG. 2 is an exploded perspective view of a display device according to an embodiment of the inventive concept.

FIG. 1 is a perspective view of a display device according to an embodiment of the inventive concept, and FIG. 2 is an exploded perspective view of a display device according to an embodiment of the inventive concept.

Referring to FIGS. 1 and 2, a display device DD may be a device activated according to an electrical signal. The display device DD according to the embodiment of the inventive concept may not be only a large-sized display device such as a television, a monitor or the like, but also a medium or small-sized display device such as a mobile phone, a tablet computer, a notebook computer, a vehicle navigator, a game machine or the like. These are only enumerated as an example, and the display device DD may also be implemented in other forms. The display device DD has a rectangular shape having long sides in a first direction DR1, and short sides in a second direction DR2 that crosses the first direction DR1. However, the shape of the display device DD is not limited thereto, and the display device DD may be provided in various shapes. The display device DD may display an image IM on a display surface IS, which is parallel to the first direction DR1 and the second direction DR2, towards a third direction DR3. The display surface IS on which the image IM is displayed may correspond to the front surface of the display device DD.

In the present embodiment, on the basis of a direction in which the image IM is displayed, a front surface (or a top surface) and a rear surface (or a bottom surface) of each member are defined. The front surface and the rear surface are opposed to each other in the third direction DR3, and normal directions of the front surface and the rear surface may be parallel to the third direction DR3.

The separation distance between the front surface and the rear surface in the third direction DR3 may correspond to the thickness of the display device DD in the third direction DR3. On the other hand, directions indicated by the first to third directions DR1, DR2, and DR3 are relative concepts to each other and may be changed to other directions.

The display device DD may detect an external input applied from the outside. The external input may include various types of inputs provided from the outside of the display device DD. The display device DD according to an embodiment of the inventive concept may detect an external user input applied from the outside. The external user input may be any one or a combination of external inputs of various types including a part of a user’s body, light, heat, a line of sight, pressure, etc. In addition, the display device DD may detect the external user input applied to a side surface or the rear surface of the display device DD depending on the structure of the display device DD. As an example of the inventive concept, an external input may include an input by a stylus pen, an active pen, a touch pen, an electronic pen, an e-pen or the like).

The display surface IS of the display device DD may be divided into a display area DA and a non-display area NDA. The display area DA may be an area in which the image IM is displayed. The user may visually recognize the image IM through the display area DA. In the present embodiment, the display area DA is illustrated in a quadrangular shape with round corners. However, this is merely an example, and the display area DA may have various shapes.

The non-display area NDA may be adjacent to the display area DA. The non-display area NDA may have a prescribed color. The non-display area NDA may surround the display area DA. Accordingly, the shape of the display area DA may be substantially defined by the non-display area NDA. However, this is merely an example. The non-display area NDA may be disposed adjacent only to one side of the display area DA, or may be omitted. The display device DD according to the inventive concept may include various implementations, and is not limited to any one implementation.

As shown in FIG. 2, the display device DD may include a display module DM and a window WM disposed on the display module DM. The display module DM may include a display panel DP and an input sensing layer ISP.

The display panel DP according to an embodiment of the inventive concept may be an emissive display panel. As an example, the display panel DP may be an organic light emitting display penal, an inorganic light emitting display panel, or a quantum dot light emitting display panel. A light emitting layer of the organic light emitting display panel may include an organic light emitting material. A light emitting layer of the organic light emitting display panel includes an organic light emitting material. A light emitting layer of the quantum dot light emitting display panel may include a quantum dot, a quantum rod, or the like.

The display panel DP may output an image IM, and the output image IM may be displayed through the display surface IS.

The input sensing layer ISP may be disposed on the display panel DP to sense an external input. The input sensing layer ISP may be directly disposed on the display panel DP. According to an embodiment of the inventive concept, the input sensing layer ISP may be provided on the display panel DP through continuous processes. In other words, when the input sensing layer ISP is directly disposed on the display panel DP, an internal adhesive film is not disposed between the input sensing layer ISP and the display panel DP. However, the internal adhesive film may be disposed between the input sensing layer ISP and the display panel DP. In this case, the input sensing layer ISP is not manufactured through continuous processes with the display panel DP, but may be manufactured through a separate process from that for the display panel DP and then fixed on the top surface of the display panel DP by the adhesive film.

The window WM may be formed of a transparent material capable of outputting an image. For example, the window WM may be formed of glass, sapphire, plastic, or the like. The window WM is illustrated to have a single layer, but the present embodiment is not limited thereto. The window WM may include a plurality of layers.

Moreover, the non-display area NDA of the display device DD may be substantially provided as an area in which a material including a prescribed color is printed in one area of the window WM. As an example of the inventive concept, the window WM may include a light shielding pattern for defining the non-display area NDA. The light shielding pattern may be a colored organic film and be provided, for example, in a coating manner.

The window WM may be combined to the display module DM through the adhesive film. As an example of the inventive concept, the adhesive film may include an Optically Clear Adhesive (OCA) film. However, the adhesive film is not limited thereto, and may include a typical adhesive or a pressure adhesive. For example, the adhesive film may include an OCA or a Pressure Sensitive Adhesive (PSA) film.

An anti-reflection layer may be further disposed between the window WM and the display module DM. The anti-reflection layer may reduce a reflection ratio of external light incident from an upper side of the window WM. The anti-reflection layer according to an embodiment of the inventive concept may include a phase retarder and a polarizer. The phase retarder may be a film type or a liquid crystal coating type, and include a $\lambda/2$ phase retarder and/or a $\lambda/4$ phase retarder. The polarizer may also be a film type or a liquid crystal coating type. The film type may include a stretched synthetic resin film, and the liquid crystal coating type may include liquid crystals arranged in a prescribed array. The phase retarder and the polarizer may be implemented with one polarization film.

As an example of the inventive concept, the anti-reflection layer may also include color filters. An array of the color filters may be determined in consideration of colors of the light generated by a plurality of pixels PX (see FIG. 3) included in the display panel DP. In this case, the anti-reflection layer may further include a light shielding pattern disposed between the color filters.

The display panel DP may display the image IM according to an electrical signal, and transmit and receive information about the external input. The display module DM may include an active area AA and a non-active area NAA. The active area AA may be an area in which the image IM is output from the display panel DP (namely, an area in which the image IM is displayed). In addition, the active area AA may also be an area in which the input sensing layer ISP senses an external input applied externally. According to an embodiment of the inventive concept, the active area AA of the display module DM may correspond to (or overlap) at least a portion of the display area DA.

The non-active area NAA is adjacent to the active area AA. The non-active area NAA may be an area in which the image IM is not displayed. For example, the non-active area NAA may surround the active area AA. However, this is merely an example, and the non-active area NAA may have various shapes. According to an embodiment of the inventive concept, the active area NAA of the display module DM may correspond to (or overlap) at least a portion of the non-display area NDA.

The display device DD may further include a plurality of flexible films FF connected to the display panel DP. A driving chip DIC may be mounted on the flexible films FF. As an example of the inventive concept, a data driver 200 (see FIG. 3) may be provided with a plurality of driving chips DIC, and the plurality of driving chips DIC may be respectively mounted on the plurality of flexible films FF.

The display device DD may further include at least one circuit board PCB coupled to the plurality of flexible films FF. As an example of the inventive concept, four circuit boards PCB are provided in the display device DD, but the number of circuit boards PCB is not limited thereto. Two adjacent circuit boards among the circuit boards PCB may be electrically connected to each other by a connection film CF. In addition, at least one of the circuit boards PCB may be electrically connected to a main board. A driving controller 100 (see FIG. 3), a voltage generator 300 (see FIG. 3) or the like may be disposed on at least one of the circuit boards PCB.

FIG. 2 illustrates a structure in which the driving chips DIC are respectively mounted on the flexible films FF, but the inventive concept is not limited thereto. For example, the driving chips DIC may be directly mounted on the display panel DP. In this case, a portion, in which the driving chip DIC of the display panel DP is mounted, of the display panel DP may be bent and disposed in the rear side of the display module DM.

The input sensing layer ISP may be electrically connected with the circuit board PCB through the flexible films FF. However, the inventive concept is not limited thereto. In other words, the display module DM may further include a separate flexible film for electrically connecting the input sensing unit ISP with the circuit board PCB.

The display device DD may further include a housing EDC configured to accommodate the display module DM. The housing EDC may be combined with the window WM to define the appearance of the display device DD. The housing EDC absorbs an externally applied impact and prevents a foreign matter/moisture or the like from being permeated to the display module DM to protect the components accommodated in the housing EDC. Moreover, as an example of the inventive concept, the housing EDC may be provided in a form such that a plurality of receiving materials are combined.

The display device DD according to an embodiment of the inventive concept may further include an electronic module including various functional modules for operating the display module DM, a power supply module (e.g., a battery) for supplying power necessary for the operation of the display device DD, a bracket coupled with the display module DM and/or the housing EDC to divide the internal space of the display device DD, or the like.

Figure 3:
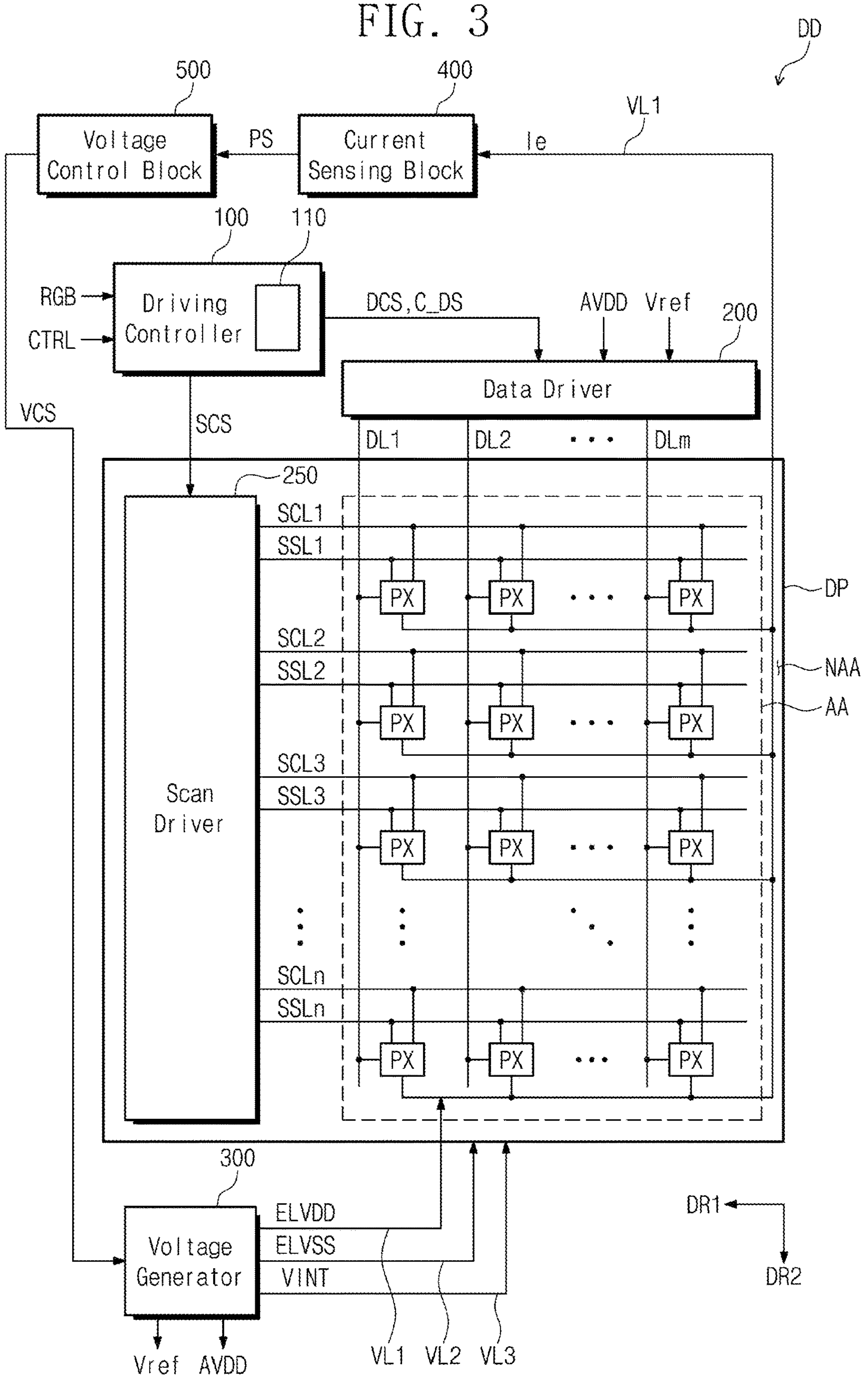
FIG. 3 is a block diagram of a display device according to an embodiment of the inventive concept.

FIG. 3 is a block diagram of a display device according to an embodiment of the inventive concept.

Referring to FIG. 3, the display device DD includes a driving controller 100, a data driver 200, a scan driver 250, a voltage generator 300, a current sensing block (or current sensing circuit) 400, a voltage control block (or voltage control circuit) 500, and a display panel DP. It is to be understood that the components of the display device DD may be implemented as circuits. For example, the current sensing block 400 and the voltage control block 500 may each be implemented as a circuit.

The driving controller 100 receives an input image signal RGB and a control signal CTRL from a main controller (e.g., a microcontroller). The driving controller 100 may convert a data format of the image signal RGB to comport with an interface specification with the data driver 200, and generate input image data. As an example of the inventive concept, the driving controller 100 may include a current compensation block (or current compensation circuit) 110. The current compensation block 110 calculates a load on the basis of the input image data, and compensates for the input image data on the basis of the load to output compensation image data C-DS.

The driving controller 100 generates a scan control signal SCS and a data control signal DCS on the basis of the control signal CTRL.

The data driver 200 receives the data control signal DCS and the compensation image data C-DS from the driving controller 100. The data driver 200 converts the compensation image data C-DS into data signals (or data voltages) on the basis of a gamma reference voltage Vref and a data driving voltage AVDD, and outputs the data signals to a plurality of data lines DL1 to DLm to be described later. The data signals are analog voltages corresponding to gray scale values of the compensation image data C-DS. The data driver 200 may be disposed in each of the driving chips DIC shown in FIG. 2.

The scan driver 250 receives the scan control signal SCS from the driving controller 100. The scan driver 250 may output first scan signals to first scan lines SCL1 to SCLn to be described later in response to the scan control signal SCS, and second scan signals to second scan lines SSL1 to SSLn in response to the scan control signal SCS.

The display panel DP includes the first scan lines SCL1 to SCLn, the second scan lines SSL1 to SSLn, data lines DL1 to DLm, and the pixels PX. The display panel DP may be divided into the active area AA and the non-active area NAA. The pixels PX are disposed in the active area AA, and the scan driver 250 may be disposed in the non-active area NAA.

The first scan lines SCL1 to SCLn and the second scan lines SSL1 to SSLn extend in the first direction DR1, and are arranged in the second direction DR2 to be spaced apart from each other. The data lines DL1 to DLm extend from the data driving circuit 200 in the second direction DR2, and are arranged in the first direction DR1 to be spaced apart from each other.

The plurality of pixels PX are electrically connected respectively to the first scan lines SCL1 to SCLn, the second scan lines SSL1 to SSLn, and the data lines DL1 to DLm. In addition, the pixels PX in a first row may be connected to the scan lines SCL1 and SSL1. In addition, the pixels PX in a second row may be connected to the scan lines SCL2 and SSL2.

Each of the plurality of pixels PX includes a light emitting element ED (see FIG. 5A), and a pixel circuit PXC (see FIG. 5A) configured to control light emission of the light emitting element ED. The pixel circuit PXC may include a plurality of transistors and a capacitor. The scan driver 250 may include transistors formed through the same process as the pixel circuit PXC. In an embodiment of the inventive concept, the light emitting element ED may include an organic light emitting diode. However, the inventive concept is not limited hereto.

In an embodiment of the inventive concept, the scan driver 250 is disposed in a first side of the display panel DP. The first scan lines SCL1 to SCLn and the second scan lines SSL1 to SSLn extend in the first direction DR1 from the scan driver 250. The scan driver 250 is disposed adjacent to a first side of the active area AA, but the inventive concept is not limited thereto. In another embodiment of the inventive concept, the scan driver 250 may be disposed adjacent to first and second sides of the active area AA. The first and second sides of the active area AA may be opposite to each other. For example, the scan driver 250 disposed adjacent to the first side of the active area AA may provide the first scan signals to the first scan lines SCL1 to SCLn, and the scan driver 250 disposed adjacent to the second side of the active area AA may provide the second scan signals to the second scan lines SSL1 to SSLn.

Each of the plurality of pixels PX may receive a first driving voltage (or a driving voltage) ELVDD, a second driving voltage ELVSS, and an initialization voltage VINT.

The voltage generator 300 generates voltages required for the operation of the display panel DP. In an embodiment of the inventive concept, the voltage generator 300 generates the first driving voltage ELVDD, the second driving voltage ELVSS, and the initialization voltage VINT necessary for the operation of the display panel DP. The first driving voltage ELVDD, the second driving voltage ELVSS, and the initialization voltage VINT may be provided to the display panel DP through a first voltage line VL1 (or a driving voltage line), a second voltage line VL2, and a third voltage line VL3.

The voltage generator 300 may further generate various voltages (e.g., the gamma reference voltage Vref, the data driving voltage AVDD, a gate-on voltage, a gate-off voltage, or the like) necessary for the operations of the data driver 200 and the scan driver 250 in addition to the first driving voltage ELVDD, the second driving voltage ELVSS and the initialization voltage VINT.

The current sensing block 400 is connected to the first voltage line VL1, and senses a driving current Ie flowing through the first voltage line VL1 for each sensing frame. The current sensing block 400 compares the sensed driving current Ie with a preset reference current to generate a protection signal PS according to the comparison result. The current sensing block 400 may provide the protection signal PS to the voltage control block 500.

The voltage control block 500 may receive the protection signal PS from the current sensing block 400, and generate a voltage control signal VCS for controlling a voltage level of at least one of voltages (for example, the gamma reference voltage Vref, the data driving voltage AVDD, or the initialization voltage VINT) generated from the voltage generator 300 on the basis of the protection signal PS. The generated voltage control signal VCS may be provided to the voltage generator 300, and the voltage generator 300 may adjust a voltage level of at least one of the gamma reference voltage Vref, the data driving voltage AVDD, or the initialization voltage VINT in response to the voltage control signal VCS.

As an example of the inventive concept, the current sensing block 400, the voltage control block 500, and the driving controller 100 shown in FIG. 3 may be mounted on the circuit board PCB shown in FIG. 2. As an example of the inventive concept, the voltage control block 500 may be built in the main controller or the driving controller 100. Alternatively, the current sensing block 400 and the voltage control block 500 may be mounted on the circuit board PCB, and the driving controller 100 may be disposed in each of the driving chips DIC shown in FIG. 2 together with the data driving circuit 200. In FIG. 3, the current sensing block 400 and the voltage control block 500 are illustrated as separate components from the driving controller 100, but the inventive concept is not limited thereto. For example, the current sensing block 400, the voltage control block 500, and the driving controller 100 may be integrated into one component (e.g., the main controller).

As an example of the inventive concept, the voltage control block 500 may communicate with the voltage generator 300 in an I2C (Inter-Integrated Circuit) interface manner. In other words, the voltage control block 500 may transmit the voltage control signal VCS to the voltage generator 300 in the I2C interface manner.

Figure 4:
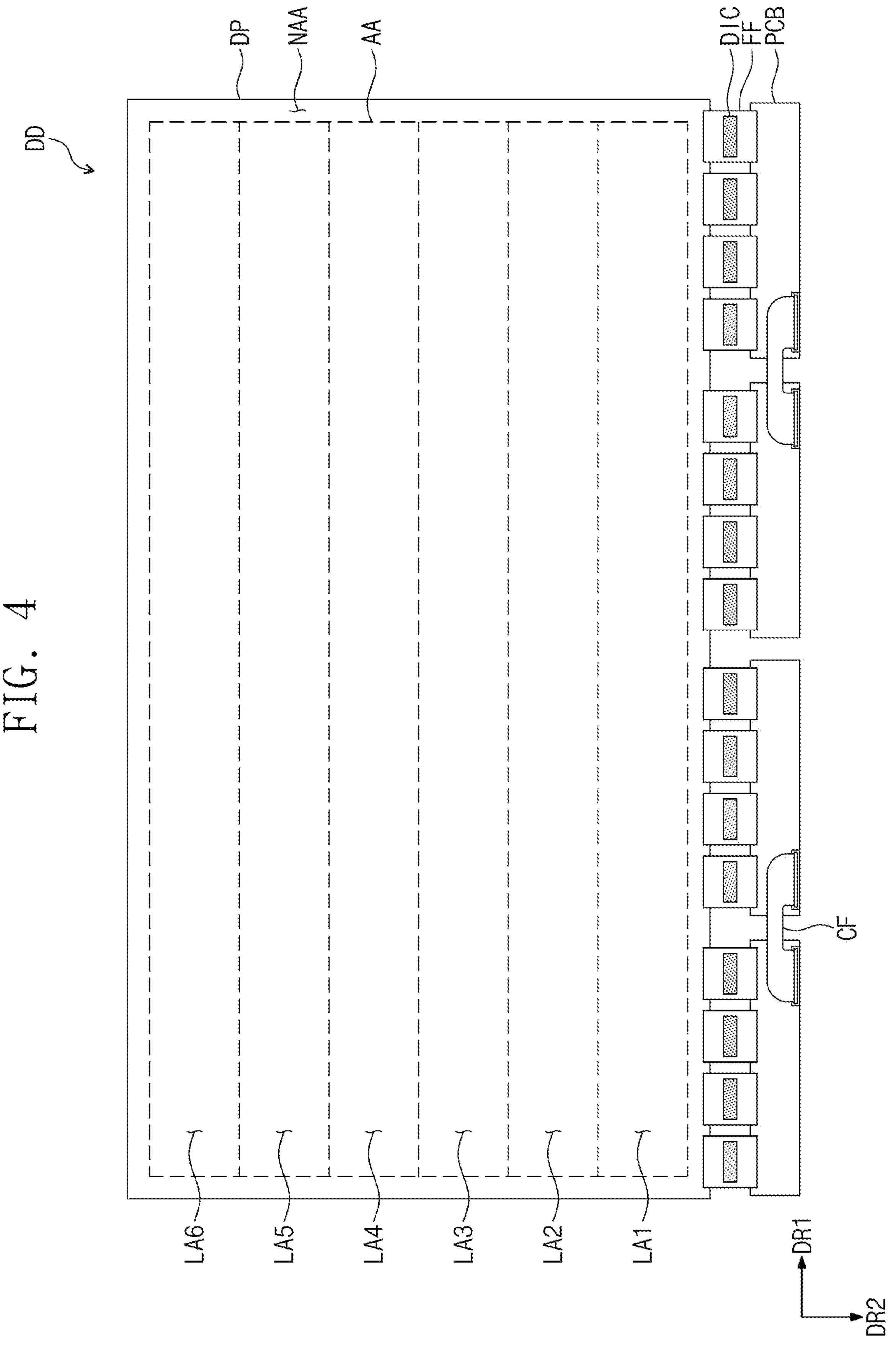
FIG. 4 is a plan view of a display device according to an embodiment of the inventive concept.

FIG. 4 is a plan view of a display device according to an embodiment of the inventive concept.

Referring to FIG. 4, the display panel DP includes the active area AA in which the image IM is displayed and the non-active area NAA adjacent to the active area AA. The active area AA is an area in which the image is substantially displayed, and the non-active area NAA is a bezel area in which the image is not displayed. In FIG. 4, a structure is illustrated in which the non-active area NAA is disposed to surround the active area AA, but the inventive concept is not limited thereto. The non-active NAA may be disposed only on at least one side of the active area AA.

The active area AA may include a plurality of line areas LA1 to LA6. The plurality of line areas LA1 to LA6 are arranged in the second direction DR2, each of which may extend in the first direction DR1 (e.g., the direction parallel to the first scan lines SCL1 to SCLn and the second scan lines SSL1 to SSLn). As an example of the inventive concept, 6 of the line areas LA1 to LA6 are illustrated and provided in the active area AA, but the number of the line areas is not particularly limited. For example, 7 or more line areas or 6 or smaller line areas may be included in the active area AA.

The plurality of line areas LA1 to LA6 are virtually divided in order to check a time point when the protection signal PS is generated. As an example of the inventive concept, the information included in the voltage control signal VCS (e.g., information about a voltage change amount) may be changed according to which line area is driven when the protection signal PS is generated. In other words, the information in the voltage control signal VCS pertaining the first line area LA1 may be different from the information in the voltage control signal VCS pertaining to the sixth line area LA6.

The voltage control block 500 will be described below in detail with reference to the drawings.

Figure 5A:
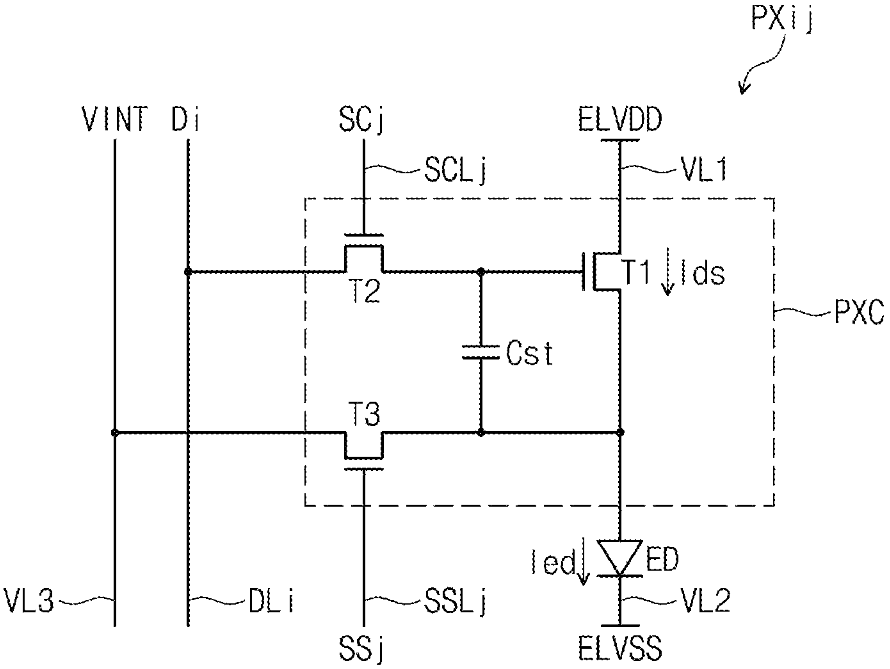
FIG. 5A is an equivalent circuit diagram of a pixel according to an embodiment of the inventive concept.
Figure 5B:
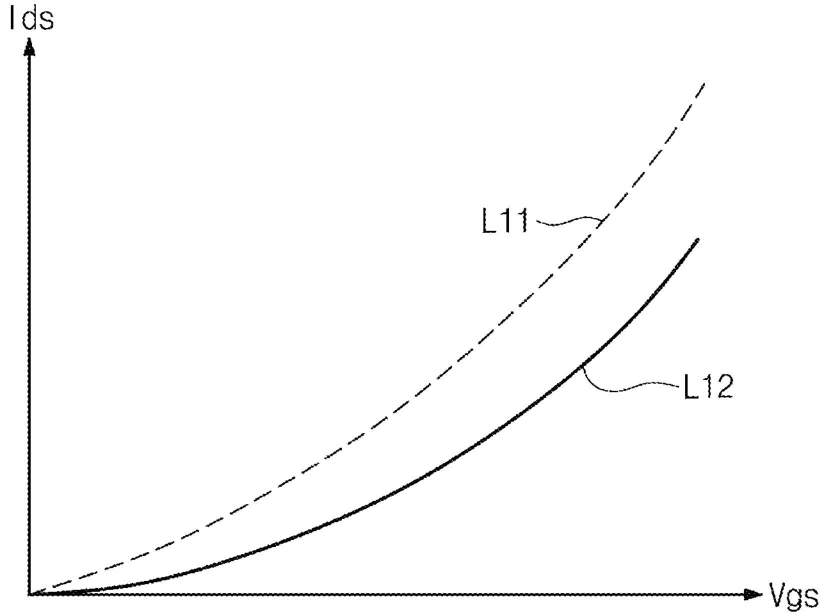
FIG. 5B shows an example of the current-voltage characteristic of a first transistor shown in FIG. 5A.

FIG. 5A is an equivalent circuit diagram of a pixel according to an embodiment of the inventive concept. FIG. 5B shows an example of the current-voltage characteristic of a first transistor shown in FIG. 5A.

FIG. 5A illustrates an example equivalent circuit diagram of a pixel PXij connected to an i-th data line DLi (hereinafter referred as a data line) among the data lines DL1 to DLm shown in FIG. 3, a j-th first scan line SCLj (hereinafter referred as a first scan line) among the first scan lines SCL1 to SCLn, and a j-th second scan line SSLj (hereinafter referred as a second scan line) among the second scan lines SSL1 to SSLN.

Each of the plurality of pixels PX shown in FIG. 3 may have the same circuit configuration as the equivalent circuit of the pixel PXij shown in FIG. 5A. In this embodiment, the pixel PXij includes at least one light emitting element ED and a pixel circuit PXC.

The pixel circuit PXC may be electrically connected to the light emitting element ED, and include at least one transistor for providing a current to the light emitting element ED, wherein the current corresponds to a data signal Di transferred from the data line DLi. As an example of the inventive concept, the pixel circuit PXC of the pixel PXij includes a first transistor T1, a second transistor T2, a third transistor T3, and a capacitor Cst. Each of the first to third transistors T1, T2 and T3 may be an N-type transistor that has an oxide semiconductor as a semiconductor layer. However, the inventive concept is not limited thereto, and each of the first to third transistors T1, T2 and T3 may be a P-type transistor having a low-temperature polycrystalline silicon (LTPS) semiconductor layer. Alternatively, at least one of the first to third transistors T1 to T3 is an N-type transistor and the rest are P-type transistors.

Referring to FIG. 5A, the first scan line SCLj may transfer a first scan signal SCj, and the second scan line SSLj may transfer a second scan signal SSj. The data line DLi transfers the data signal Di. The data signal Di may have a voltage level corresponding to the compensation image data C-DS (see FIG. 3).

The first voltage line VL1 and the third voltage line VL3 respectively transfer the first driving voltage ELVDD and the initialization voltage VINT to the pixel circuit PXC, and the second voltage line VL2 may transfer the second driving voltage ELVSS to a cathode (or a second terminal) of the light emitting element ED.

The first transistor T1 includes a first electrode connected to the first voltage line VL1, a second electrode electrically connected to an anode (or a first terminal) of the light emitting element ED, and a gate electrode connected to one terminal of the capacitor Cst. For example, the gate electrode of the first transistor T1 may be connected to a first terminal of the capacitor Cst. The first transistor T1 may provide an emission current led to the light emitting device ED in response to the data signal Di transferred through the data line DLi according to a switching operation of the second transistor T2.

The second transistor T2 includes a first electrode connected to the data line DLi, a second electrode connected to the gate electrode of the first transistor T1, and a gate electrode connected with the first scan line SCLj. The second electrode of the second transistor T2 is also connected with the first terminal of the capacitor Cst. The second transistor T2 may be turned on according to the first scan signal SCj transferred through the first scan line SCLj, and transfer the data signal Di transferred through the data line DLi to the gate electrode of the first transistor T1.

The third transistor T3 includes a first electrode connected to the third voltage line VL3, a second electrode connected to the anode of the light emitting element ED, and a gate electrode connected to the second scan line SSLj. The second electrode of the third transistor T3 is also connected to a second terminal of the capacitor Cst. The third transistor T3 may be turned on according to the second scan signal SSj transferred through the second scan line SSLj to transfer the initialization voltage VINT to the anode of the light emitting element ED.

The first terminal of the capacitor Cst is connected to the gate electrode of the first transistor T1, the second terminal of the capacitor Cst is connected to the first electrode of the first transistor T1. The structure of the pixel PXij according to the embodiment is not limited to that shown in FIG. 5A. The numbers of the transistors and the capacitors included in the pixel PXij and a connection relationship between them are modifiable in various ways.

Referring to FIGS. 5A and 5B, in the first transistor T1, a current Ids that flows from the first electrode to the second electrode may change according to a voltage Vgs between the gate electrode and the second electrode.

The current-voltage characteristics of the first transistor T1 may change according to a voltage level of the data signal Di or the initialization VINT.

In FIG. 5B, a first curve L11 shows the current-voltage characteristics of the first transistor T1 when the initialization voltage VINT has a first voltage level, and a second curve L12 shows the current-voltage characteristics of the first transistor T1 when the initialization voltage VINT has a second voltage level that is higher than the first voltage level.

As can be seen from FIG. 5B, as the voltage level of the initialization voltage VINT increases, the current Ids flowing from the first electrode to the second electrode of the first transistor T1 decreases. In other words, the emission current Ied of the light emitting element ED may be controlled by adjusting the voltage level of the initialization voltage VINT.

Figure 6:
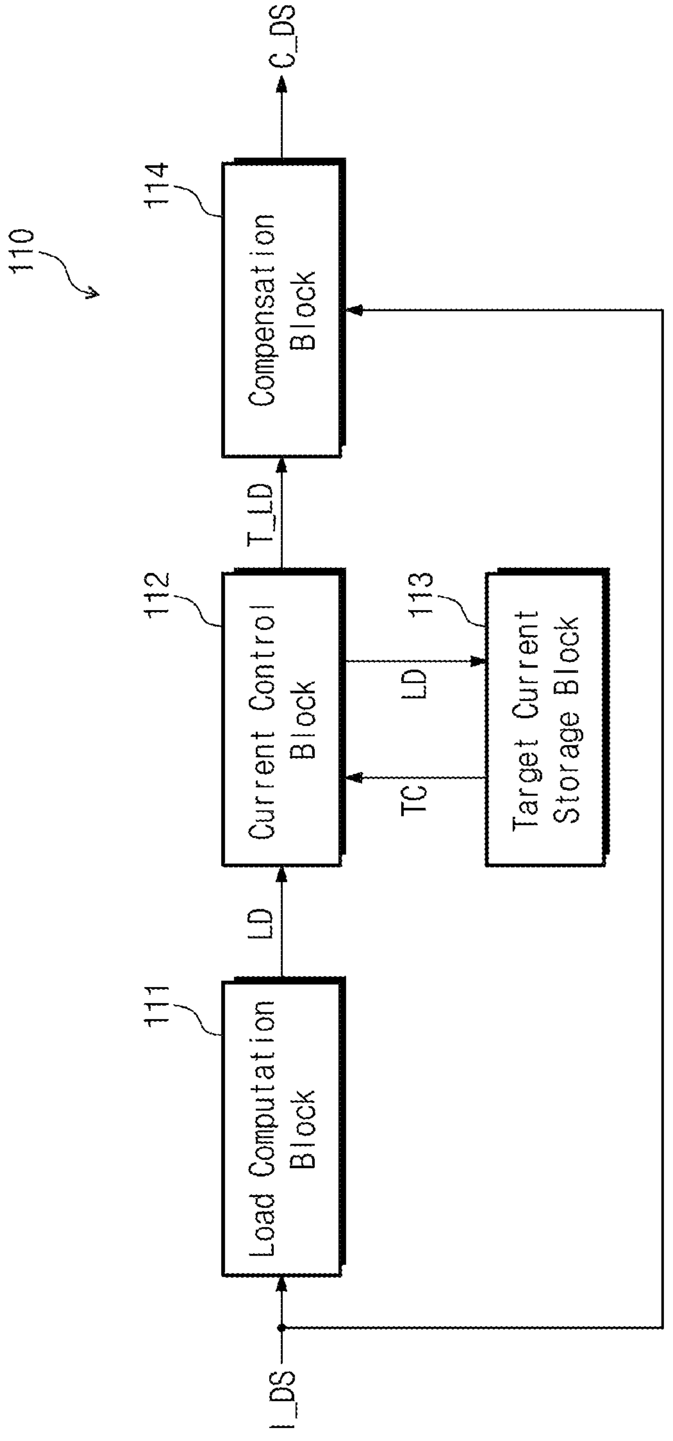
FIG. 6 is an internal block diagram of a current compensation block according to an embodiment of the inventive concept.

FIG. 6 is an internal block diagram of a current compensation block according to an embodiment of the inventive concept.

Referring to FIGS. 3 and 6, the current compensation block 110 may be built in the driving controller 100. However, the inventive concept is not limited thereto. The current compensation block 110 may be disposed as a component independent from the driving controller 100. Alternatively, the current compensation block 110 may be built in the main controller.

The current compensation block 110 includes a load computation block 111, a current control block 112, a storage block (or target current storage block) 113, and a compensation block 114. It is to be understood that the components of the current compensation block 110 may each be implemented as a circuit.

The load computation block 111 may directly receive the input image signal RGB (see FIG. 3), or receive input image data I_DS converted from the input image signal RGB. The input image data I-DS may be input for each frame. The load computation block 111 may compute a load LD for one frame (or the current frame) on the basis of the input image data I-DS. The current control block 112 receives the load LD from the load computation block 111. The current control block 112 selects a target current TC corresponding to the received load LD from the storage block 113, and converts the load LD into a target load T_LD using the target current TC.

The storage block 113 may include a lookup table in which target currents matching the magnitudes of the load LD are stored. The current control block 112 may select the target current TC from among the stored target currents in correspondence to the magnitude of the load LD computed on the basis of the input image data I_DS of the current frame. In other words, the current control block 112 may select a target current TC corresponding to the load LD received at the current control block 112. The current control block 112 may adjust the magnitude of the load LD on the basis of the target current TC to convert the load LD into the target load T_LD. For example, the target load T_LD may have a smaller magnitude than the load LD.

The compensation block 113 may receive the target load T_LD from the current control block 112. In addition, the compensation block 114 may receive the input image data I_DS and compensate for the input image data I_DS on the basis of the target load T_LD to generate the compensation image data C_DS. For example, the compensation block 114 determines a compensation scale on the basis of the target load T_LD and reduces the grayscale of the input image data I_DS by the compensation scale to generate the compensation image data C_DS. Accordingly, the driving current Ie (see FIG. 3) of the display panel DP may be reduced when an image is displayed using the compensation image data C_DS in comparison to a case where the image is displayed using the input image data I_DS. Accordingly, the entire power consumption of the display device DD may be reduced through the operation (hereinafter, a current compensation operation) of the current compensation block 110.

However, a time corresponding to one frame may be required to generate the compensation image data C_DS using the current compensation block 110. In other words, when the input image data I_DS changes and thus the load LD also changes, the current compensation operation may be reflected to the display panel DP after one frame. Accordingly, the current compensation operation may not be reflected to the display panel DP in the first frame after the change of the load LD. According to an embodiment of the inventive concept, the current compensation may be executed through the voltage control block 500 in the first frame (or an uncompensated frame) to which the current compensation operation has not been reflected.

Figure 7:
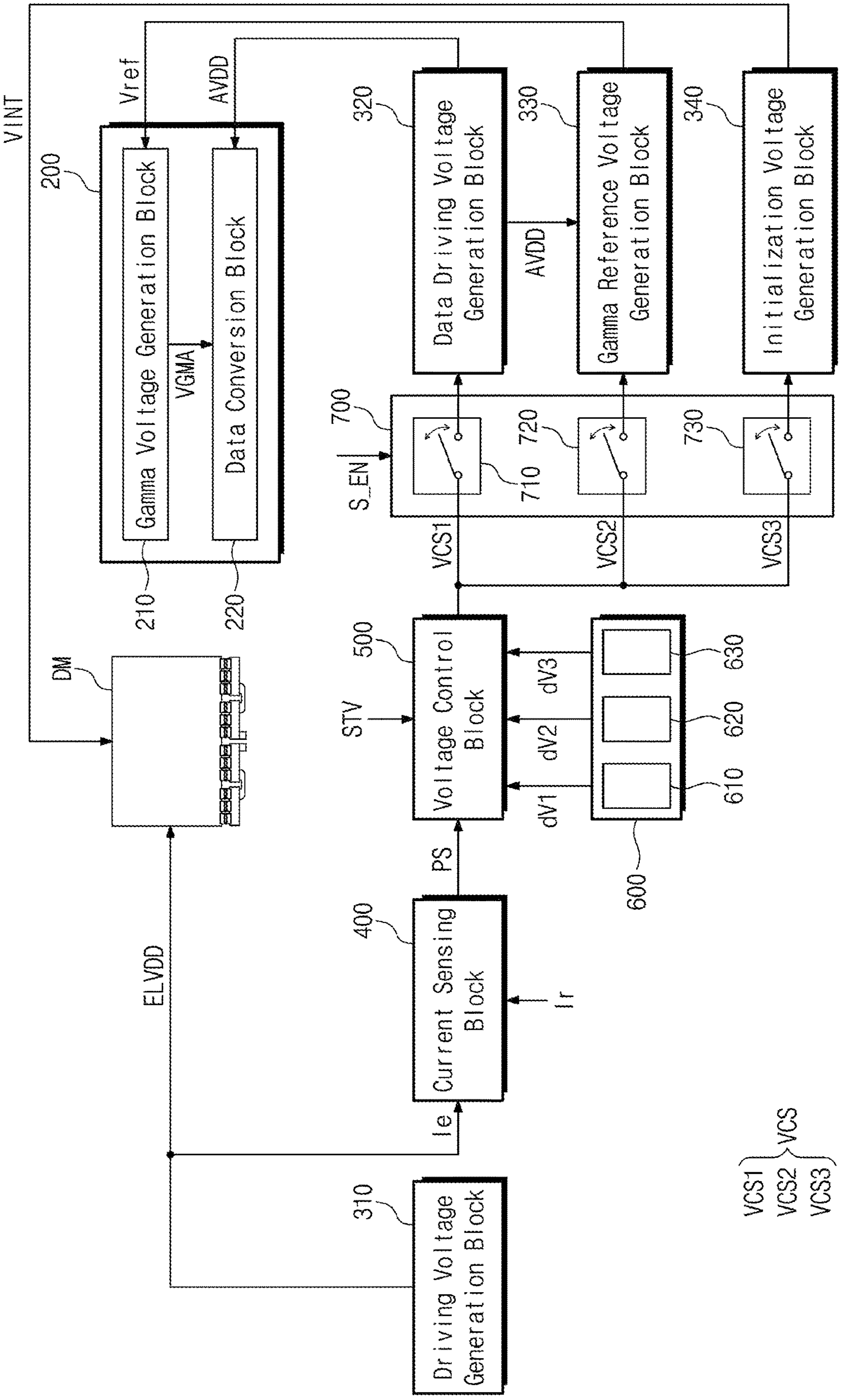
FIG. 7 is a block diagram for explaining the operation flow of a display device according to an embodiment of the inventive concept.
Figure 8A:
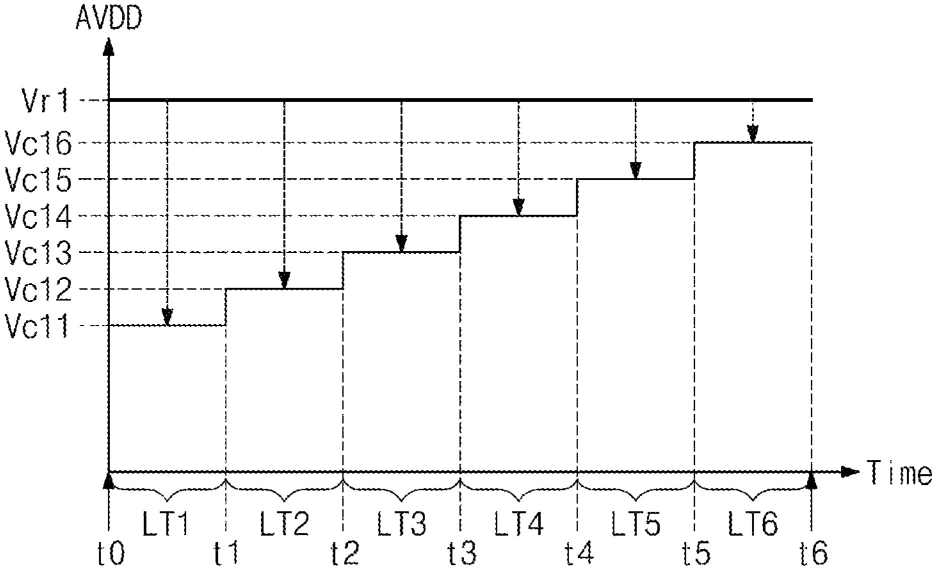
FIGS. 8A, 8B and 8C respectively illustrate changes in a data driving voltage, a gamma reference voltage, and a initialization voltage over time according to an embodiment of the inventive concept.
Figure 8B:
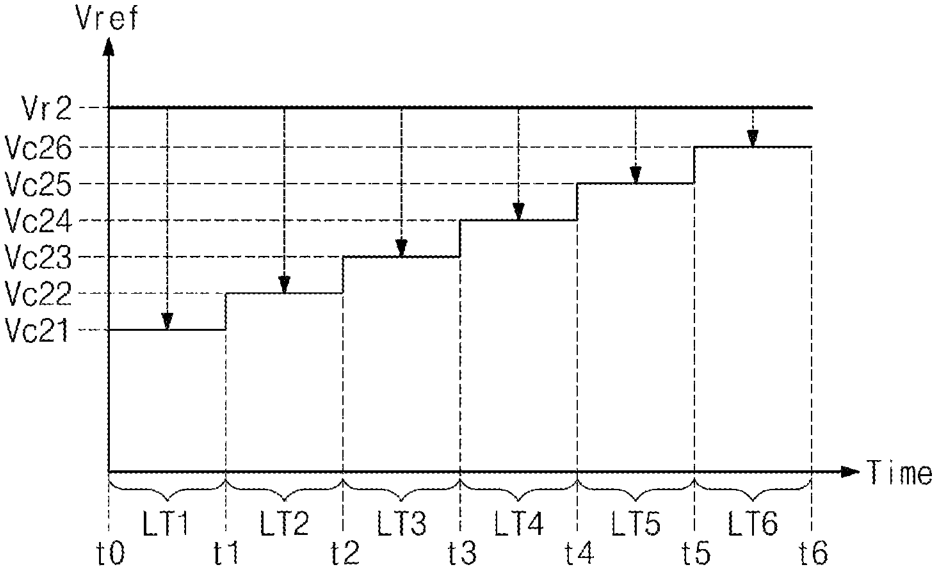
Figure 8C:
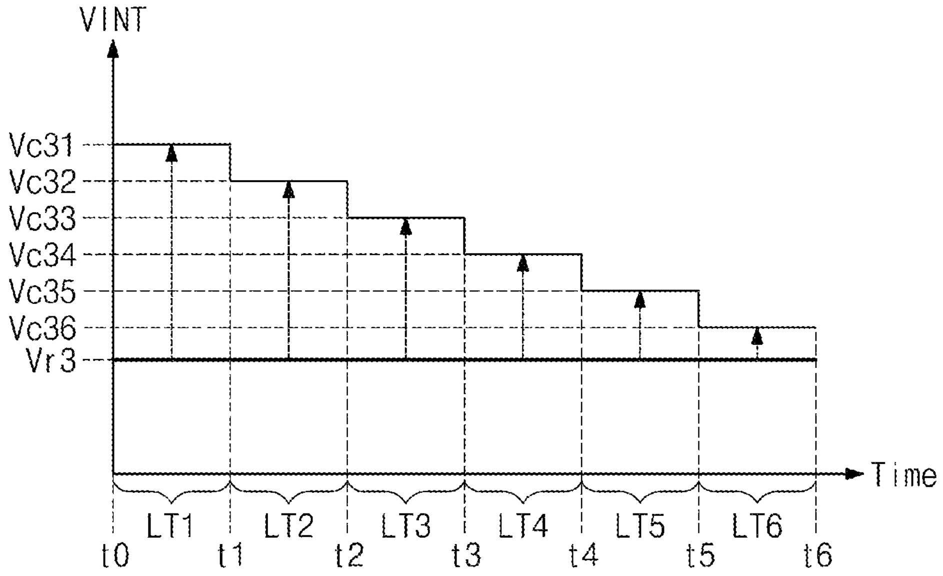

FIG. 7 is a block diagram for explaining the entire operation flow of a display device according to an embodiment of the inventive concept. FIGS. 8A to 8C respectively illustrate changes in the data driving voltage, the gamma reference voltage, and the initialization voltage over time according to an embodiment of the inventive concept.

Referring to FIGS. 3 and 7, the data driver 200 includes a gamma voltage generation block 210 and a data conversion block 220. Since the data driver 200 may be implemented in circuit form, the components thereof, including but not limited to the gamma voltage generation block 210 and the data conversion block 220 may be circuits. The gamma voltage generation block 210 may generate a plurality of gamma voltages VGMA on the basis of the gamma reference voltage Vref. The gamma voltages VGMA may be provided to the data conversion block 220. The data conversion block 220 may receive the compensation image data C_DS from the driving controller 100. Accordingly, the data conversion block 220 may convert the compensation image data C_DS into a data signal (or a data voltage) on the basis of the gamma voltages VGMA and the data driving voltage AVDD. Even when auxiliary image data of the same grayscale is input, when the voltage levels of the gamma voltages VGMA and the data driving voltage AVDD change, a voltage level of the data signal may also change accordingly. Here, the voltage levels of the gamma voltages VGMA may be determined by the gamma reference voltage Vref. As an example of the inventive concept, the gamma reference voltage Vref may include a first gamma reference voltage for determining the voltage level of the maximum gamma voltage among the gamma voltages VGMA and a second gamma reference voltage for determining the voltage level of the minimum gamma voltage among the gamma voltages VGMA. Even when one voltage level of the first and second gamma reference voltages changes, the voltage levels of the gamma voltages VGMA output from the gamma voltage generation block 210 may change.

The voltage generator 300 may include a driving voltage generation block 310, a data driving voltage generation block 320, a gamma reference voltage generation block 330 and an initialization voltage generation block 340. Each component of the voltage generator 300 may be implemented in circuit form.

The driving voltage generation block 310 may generate and provide the first driving voltage ELVDD to the display module DM. The first driving voltage ELVDD may be provided to the display module DM through a voltage supply line (e.g., the first voltage line VL1 (see FIG. 5A). As an example of the inventive concept, the driving voltage generation block 310 may further generate the second driving voltage ELVSS as well as the first driving voltage ELVDD. In this case, the driving voltage generation block 310 may provide the second driving voltage ELVSS to the display module DM.

The data driving voltage generation block 320 may generate and provide the data driving voltage AVDD to the data driver 200 (e.g., the data conversion block 220). In addition, the data driving voltage generation block 320 may generate and provide the data driving voltage AVDD to the gamma reference voltage generation block 330. The gamma reference voltage generation block 330 may generate and provide the gamma reference voltage Vref to the data driver 200 (e.g., the gamma voltage generation block 210). The initial voltage generation block 340 may generate and provide the initialization voltage VINT to the display module DM.

The current sensing block 400 is connected to the voltage supply line and senses the driving current Ie, which flows through the voltage supply line, for each frame. The current sensing block 400 compares the sensed driving current Ie with a preset reference current Ir to generate the protection signal PS. For example, when the driving current Ie is greater than the reference current Ir, the protection signal PS is activated, and when the driving current Ie is smaller than the reference current Ir, the protection signal PS is inactivated.

The voltage control block 500 may receive the protection signal PS from the current sensing block 400. When receiving the activated protection signal PS, the voltage control block 500 may be enabled, and when receiving the inactivated protection signal PS, the voltage control block 500 may be disabled.

The voltage control block 500 may receive a start information signal including information about a start time point of one frame. As an example of the inventive concept, the voltage control block 500 may receive a start signal STV as a start information signal. The start signal STV may be included in the scan control signal SCS supplied to the scan driver 250, and be a signal for starting the operation of the scan driver 250. However, the embodiment of the inventive concept is not limited thereto. Alternatively, the voltage control block 500 may also receive a vertical synchronizing signal included in a control signal CTRL as the start information signal.

The voltage control block 500 may compute a time point of generation of the protection signal PS on the basis of the start signal STV. In other words, the voltage control block 500 may determine which line area operates among the line areas LA1 to LA6 (see FIG. 4) divided in the display panel DP at the time point of generation of the protection signal PS. The voltage control block 500 may compute a time interval between a start time point (see FIG. 10A) of the start signal STV and a time point ta (see FIG. 10A) of generation of the protection signal PS, and set a target compensation value according to the time interval with reference to a memory 600. As an example of the inventive concept, a target change amount may include a first target compensation value dV1, a second target compensation value dV2, and a third target compensation value dV3.

As an example of the inventive concept, the memory 600 may include a first lookup table 610, a second lookup table 620, and a third lookup table 630. However, the inventive concept is not limited thereto. For example, the memory 600 may include only one or two of the first to third lookup tables 610, 620, and 630.

The first lookup table 610 stores first voltage compensation values according to the size of the time interval, the second lookup table 520 stores second voltage compensation values according to the size of the time interval, and the third lookup table 630 stores third voltage compensation values according to the size of the time interval. Here, the first voltage compensation value may be a compensation value for determining a compensation level of the data driving voltage AVDD, and the second voltage compensation value may be a compensation value for determining a compensation level of the gamma reference voltage Vref. The third voltage compensation value may a compensation value for determining a compensation level of the initialization voltage VINT.

The voltage control block 500 may set, as the first target compensation value dV1, one first voltage compensation value corresponding to the time interval among the first voltage compensation values, and set, as the second target compensation value dV2, one second voltage compensation value corresponding to the time interval among the second voltage compensation values. In addition, the voltage control block 500 may set, as the third target compensation value dV3, one third voltage compensation value corresponding to the time interval among the third voltage compensation values.

The voltage control block 500 may generate the voltage control signal VCS on the basis of the first to third target compensation values dV1, dV2, and dV3. The voltage control signal VCS may include a first voltage control signal VCS1 generated on the basis of the first target compensation value dV1, a second voltage control signal VCS2 generated on the basis of the second target compensation value dV2, and a third voltage control signal VCS3 generated on the basis of the third target compensation value dV3. The voltage control block 500 may transmit the first to third voltage control signals VCS1 to VCS3 to the voltage generator 300. In particular, the first voltage control signal VCS1 is transmitted to the data driving voltage generation block 320, the second voltage control signal VCS2 is transmitted to the gamma reference voltage generation block 330, and the third voltage control signal VCS3 is transmitted to the initialization voltage generation block 340. As an example of the inventive concept, the voltage control block 500 may communicate with the voltage generator 300 in the I2C interface manner.

A switching block 700 may be further disposed between the voltage control block 500 and the voltage generator 300. The switching block 700 may include a first switching block 710, a second switching block 720, and a third switching block 730. Each of the first to third switching blocks 710-730 may be implemented with a switch. The first switching block 710 is disposed between the voltage control block 500 and the data driving voltage generation block 320, and the second switching block 720 is disposed between the voltage control block 500 and the gamma reference voltage generation block 330. The third switching block 730 is disposed between the voltage control block 500 and the initialization voltage generation block 340.

The first to third switching blocks 710, 720, and 730 may be enabled in response to a switch enable signal S_EN. When the switch enable signal S_EN is activated, the first to third switching blocks 710 to 730 are enabled and thus communication between the voltage control block 500 and the voltage generator 300 may be activated. However, when the switch enable signal S_EN is not activated, the first to third switching blocks 710 to 730 are disabled and thus a communication between the voltage control block 500 and the voltage generator 300 may be inactivated.

FIG. 7 illustrates a case where the first to third switching blocks 710 to 730 are substantially simultaneously activated or inactivated by one switch enable signal S_EN, but the inventive concept is not limited thereto. Alternatively, first to third switching enable signals for activating or inactivating the first to third switching blocks 710 to 730 may be respectively provided to the first to third switching blocks 710 to 730. The switch enable signal S_EN may be a signal provided from the driving controller 100 (see FIG. 3).

The data driving voltage generation block 320 may adjust the voltage level of the data driving voltage AVDD in response to the first voltage control signal VCS1. The gamma reference voltage generation block 330 may adjust the voltage level of the gamma reference voltage Vref in response to the second voltage control signal VCS2. The adjusted data driving voltage AVDD and the adjusted gamma reference voltage Vref may be provided to the data driver 200. The initialization voltage generation block 340 may adjust the voltage level of the initialization voltage VINT in response to the third voltage control signal VCS3. The adjusted initialization voltage VINT may be provided to the display module DM.

An embodiment of the inventive concept provides a display device DD including: a display panel DP including a pixel PX; a current compensation circuit 110 configured to execute a current compensation operation in which a load LD is calculated based on input image data I_DS, and output compensation image data C_DS is generated by compensating for the input image data I_DS based on the load LD; a data driver 200 configured to convert the compensation image data C_DS into a data voltage based on a gamma reference voltage Vref and a data driving voltage AVDD, and output the data voltage to the display panel DP; a current sensing circuit 400 configured to sense a driving current Ie of the display panel DP and compare the driving current Ie with a preset reference current Ir to output a protection signal PS; a voltage generator 300 configured to generate the driving voltage ELVDD, the gamma reference voltage Vref, and the data driving voltage AVDD; and a voltage control circuit 500 configured to generate a first voltage control signal VCS for controlling a first target compensation value of at least one of the gamma reference voltage Vref and the data driving voltage AVDD in response to the protection signal PS, and provide the first voltage control signal VCS to the voltage generator 300.

Referring to FIGS. 4, 8A to 8C, a plurality of reference time points t1, t2, t3, t4, and t5 may be present between a start time point t0 and a finish time point t6 of the uncompensated frame. The uncompensated frame may be divided into a plurality of periods LT1, LT2, LT3, LT4, LT5, and LT6 on the basis of the plurality of reference time points t1, t2, t3, t4 and t5. As an example of the inventive concept, the plurality of periods LT1, LT2, LT3, LT4, LT5 and LT6 may be first to sixth periods LT1 to LT6.

The first period LT1 is a period from the start time point t0 to a first reference time point t1 among the plurality of reference time points t1 to t5, and may be the period in which the first line area LA1 of the display panel DP operates. The second period LT2 is a period from the first reference time point t1 to a second reference time point t2 among the plurality of reference time points t1 to t5, and may be the period in which the second line area LA2 of the display panel DP operates. The third period LT3 is a period from the second time point t2 to a third reference time point t3 among the plurality of reference time points t1 to t5, and may be the period in which the third line area LA3 of the display panel DP operates.

The fourth period LT4 is a period from the third time point t3 to a fourth reference time point t4 among the plurality of reference time points t1 to t5, and may be the period in which the fourth line area LA4 of the display panel DP operates. The fifth period LT5 is a period from the fourth reference time point t4 to a fifth reference time point t5 among the plurality of reference time point s t1 to t5, and may be the period in which the fifth line area LA5 of the display panel DP operates. The sixth period LT6 is a period from the fifth time point t5 to the finish time point t6 among the plurality of reference time point s t1 to t5, and may be the period in which the sixth line area LA6 of the display panel DP operates.

Referring to FIGS. 7 and 8A, the data driving voltage AVDD may have a first reference level Vr1 in a state where the protection signal PS is inactivated. When the protection signal PS is activated, the first reference level Vr1 may be changed to any one of first to sixth compensation levels Vc11, Vc12, Vc13, Vc14, Vc15, and Vc16. The first to sixth compensation levels Vc11 to Vc16 may be voltage levels obtained by compensating for the first reference level Vr1 on the basis of the first voltage compensation values respectively set in correspondence to the first to sixth periods LT1 to LT6. As an example of the inventive concept, each of the first to sixth compensation levels Vc11 to Vc16 may be a voltage level lower than the first reference level Vr1.

When a time interval between a time point at which the protection signal PS is activated and the start time point to is in the first period LT1, the voltage level of the data driving voltage AVDD may be reduced to the first compensation level Vc11 from the first reference level Vr1. When the time interval is in the second period LT2, the voltage level of the data driving voltage AVDD may be reduced to the second compensation level Vc12 from the first reference level Vr1. As it goes from the first period LT1 in which the time interval from the start time point t0 is small to the sixth period LT6 in which the time interval is large, the voltage level of the data driving voltage AVDD may change in a direction close to the first reference level Vr1. In other words, as it goes to a period in which the time interval is large, a voltage change amount of the data driving voltage AVDD may become reduced. Thus, for example, the voltage change amount of the data driving voltage AVDD may be large in the first period LT1 and small in the sixth period LT6.

Referring to FIGS. 7 and 8B, the gamma reference voltage Vref may have a second reference level Vr2 in a state where the protection signal PS is inactivated. When the protection signal PS is activated, the second reference level Vr2 may be changed to any one of seventh to twelfth compensation levels Vc21, Vc22, Vc23, Vc24, Vc25, and Vc26. The seventh to twelfth compensation levels Vc21 to Vc26 may be voltage levels obtained by compensating for the second reference level Vr2 on the basis of the second voltage compensation values respectively set in correspondence to the first to sixth periods LT1 to LT6. As an example of the inventive concept, each of the seventh to twelfth compensation levels Vc21 to Vc26 may be a voltage level lower than the second reference level Vr2.

When a time interval between a time point at which the protection signal PS is activated and the start time point t0 is in the first period LT1, the voltage level of the gamma reference voltage Vref may be reduced to the seventh compensation level Vc21 from the second reference level Vr2. When the time interval is in the second period LT2, the voltage level of the gamma reference voltage Vref may be reduced to the eighth compensation level Vc22 from the second reference level Vr2. As it goes from the first period LT1 in which the time interval from the start time point t0 is small to the sixth period LT6 in which the time interval is large, the voltage level of the gamma reference voltage Vref may change in a direction close to the second reference level Vr2. In other words, as it goes to a period in which the time interval is large, a voltage change amount of the gamma reference voltage Vref may become reduced. Thus, for example, the voltage change amount of the gamma reference voltage Vref may be large in the first period LT1 and small in the sixth period LT6.

Referring to FIGS. 7 and 8C, the initialization voltage VINT may have a third reference level Vr3 in a state where the protection signal PS is inactivated. When the protection signal PS is activated, the third reference level Vr3 may be changed to any one of 13th to 18th compensation levels Vc31, Vc32, Vc33, Vc34, Vc35, and Vc36. The 13th to 18th compensation levels Vc31 to Vc36 may be voltage levels obtained by compensating for the third reference level Vr3 on the basis of the third voltage compensation values respectively set in correspondence to each of the first to sixth periods LT1 to LT6. As an example of the inventive concept, each of the 13th to 18th compensation levels Vc31 to Vc36 may be a voltage level greater than the third reference level Vr3.

When a time interval between a time point at which the protection signal PS is activated and the start time point t0 is in the first period LT1, the voltage level of the initialization voltage VINT may be increased to the 13th compensation level Vc31 from the third reference level Vr3. When the time interval is in the second period LT2, the voltage level of the initialization voltage VINT may be increased to the 14th compensation level Vc32 from the third reference level Vr3. As it goes from the first period LT1 in which the time interval from the start time point t0 is small to the sixth period LT6 in which the time interval is large, the voltage level of the initialization voltage VINT may change in a direction close to the third reference level Vr3. In other words, as it goes to a period in which the time interval is large, a voltage change amount of the initialization voltage VINT may be reduced. Thus, for example, the voltage change amount of the initialization voltage VINT may be large in the first period LT1 and small in the sixth period LT6.

Figure 9A:
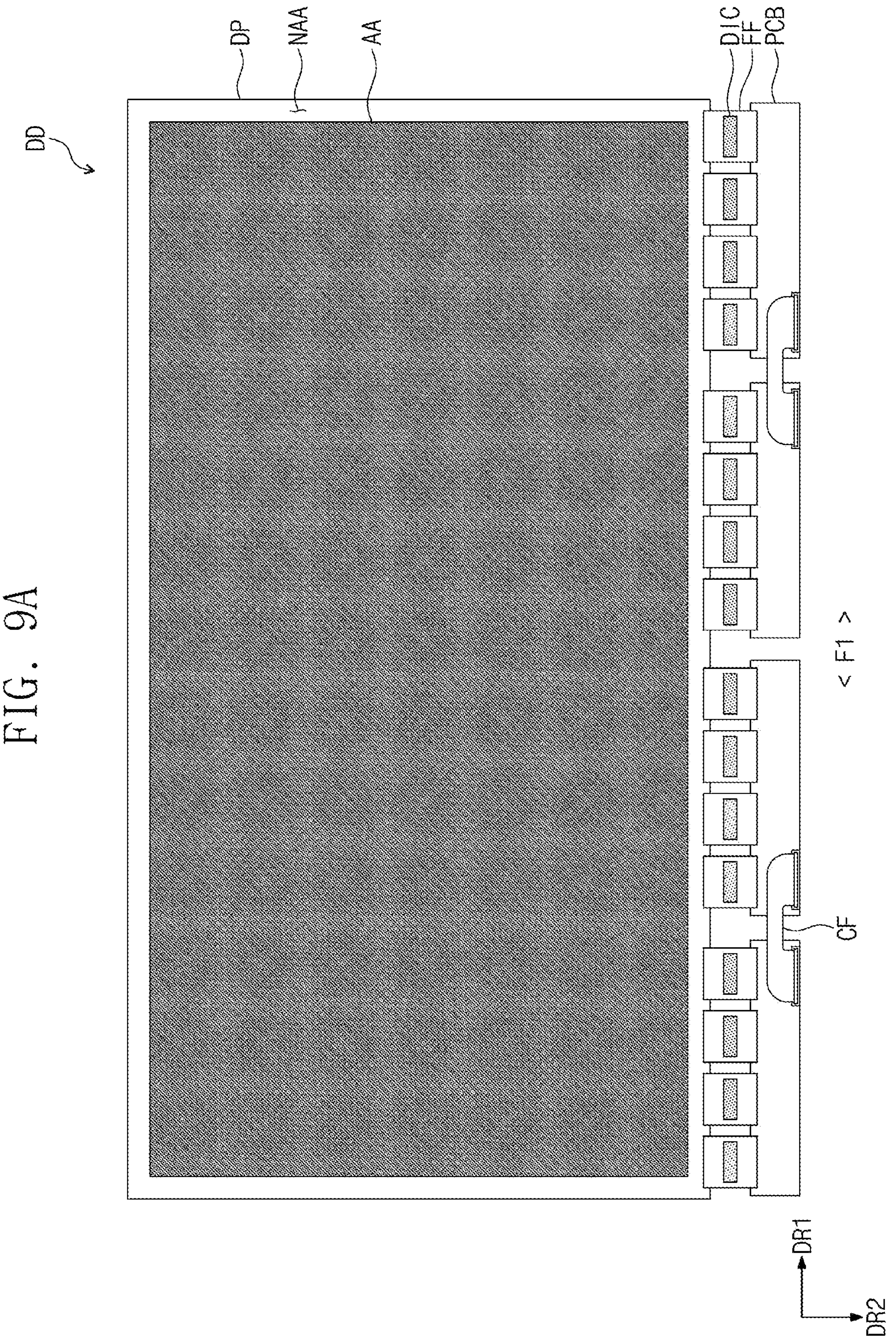
FIGS. 9A, 9B and 9C respectively illustrate images displayed on a display panel during first to third frames according to an embodiment of the inventive concept.
Figure 9B:
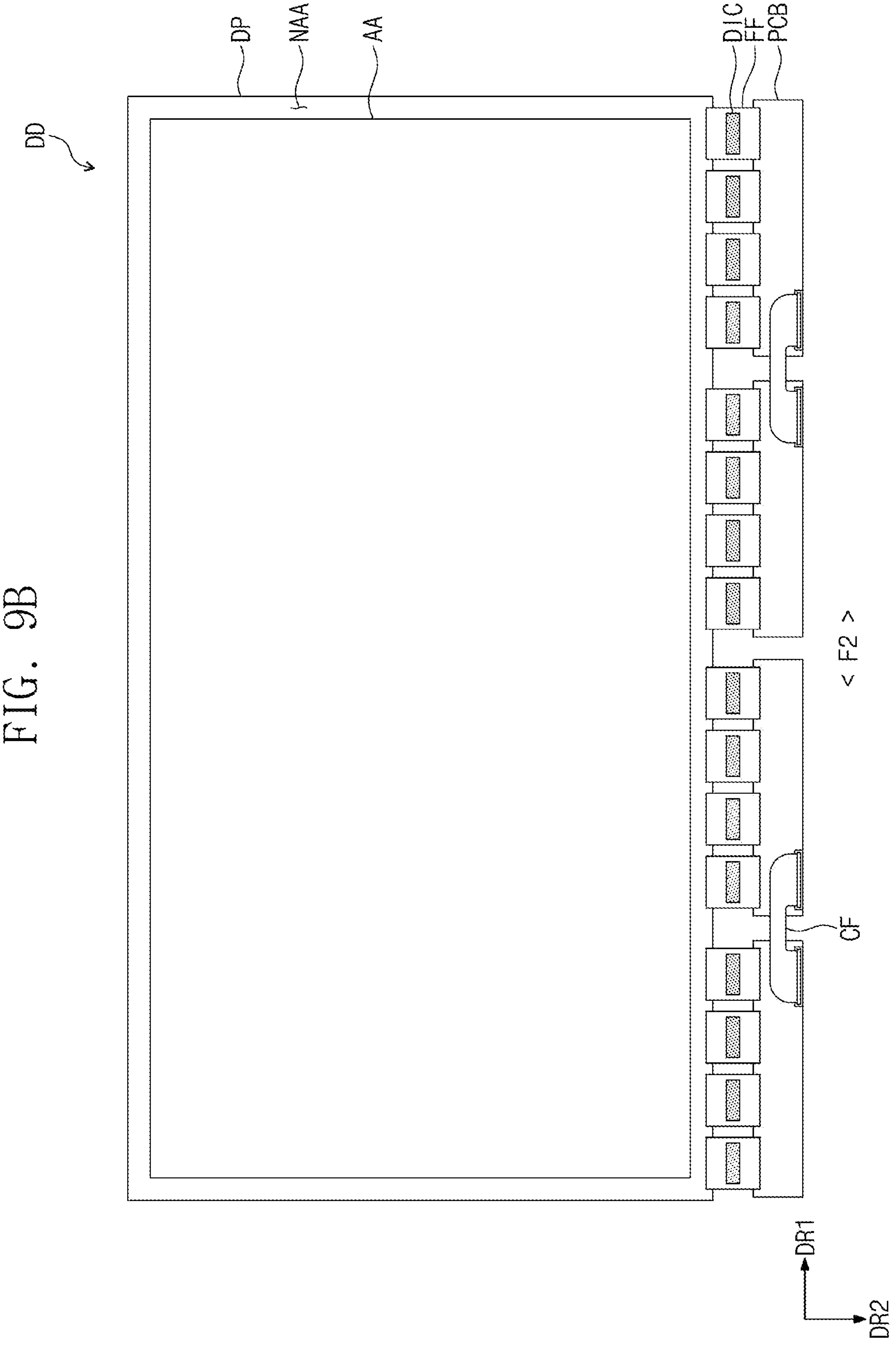
Figure 9C:
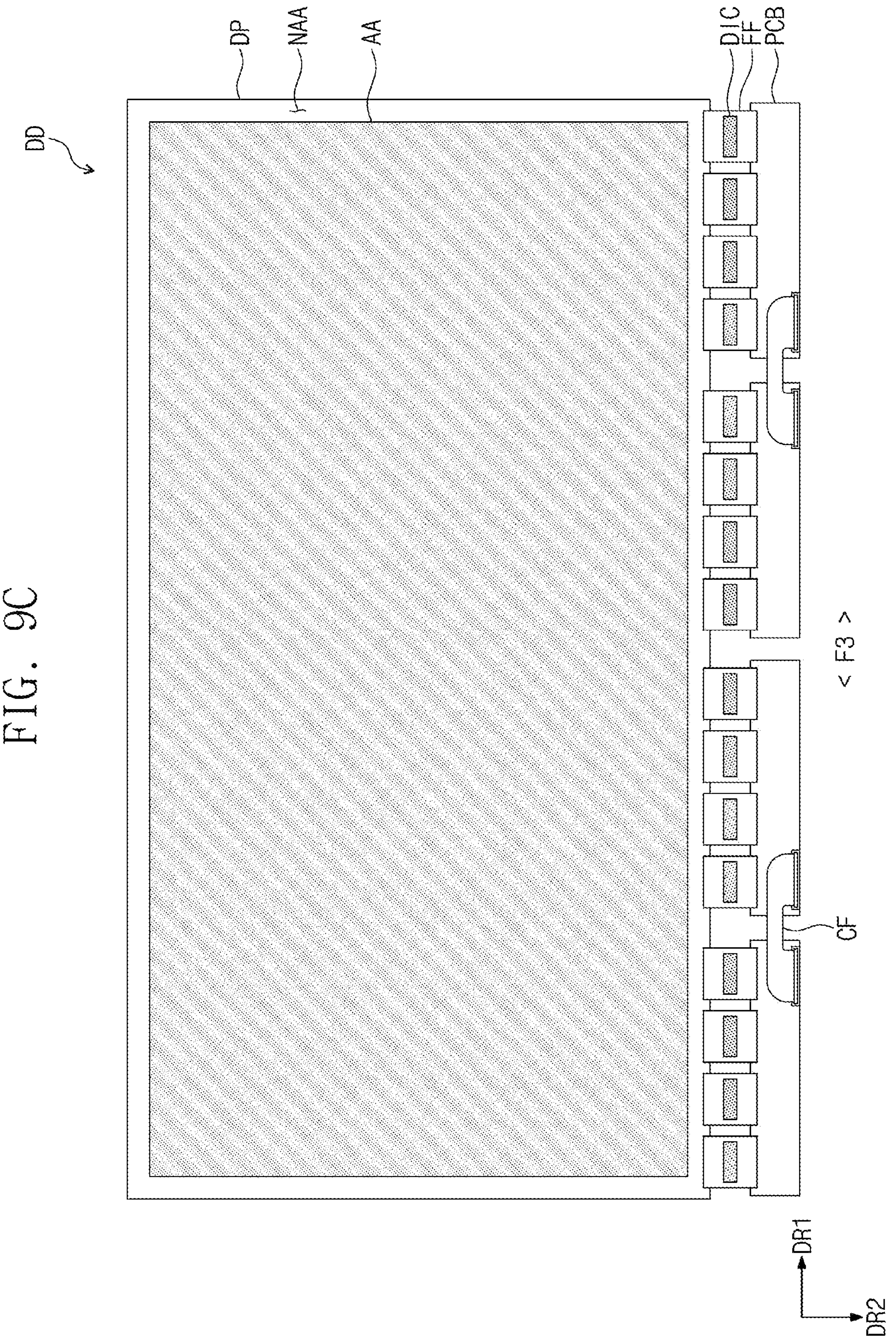
Figure 10A:
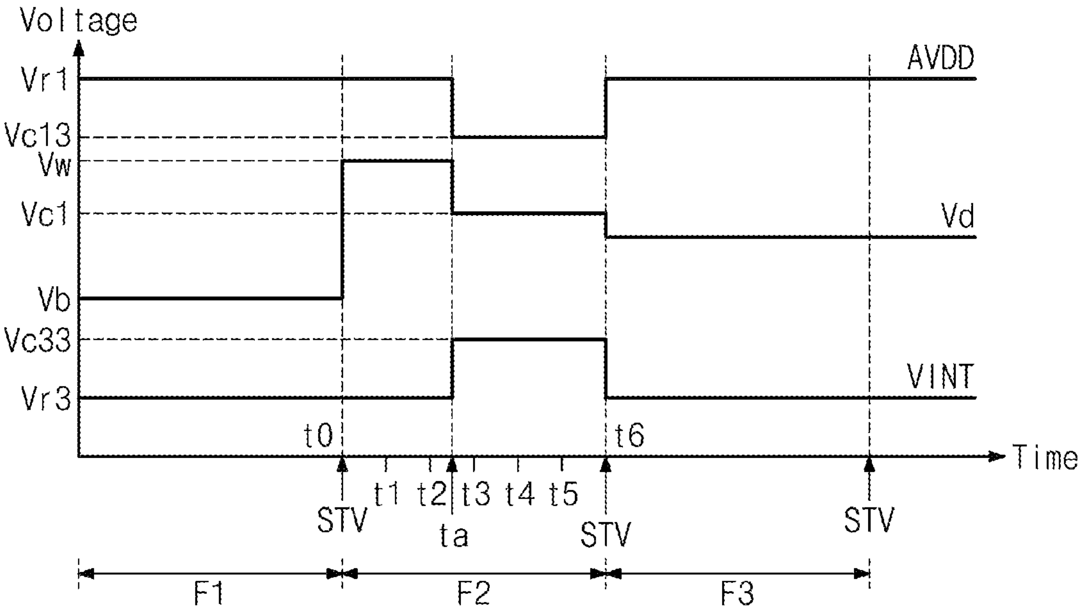
FIG. 10A illustrates a case where a data driving voltage and an initialization voltage change at a first time point according to an embodiment of the inventive concept.
Figure 10B:
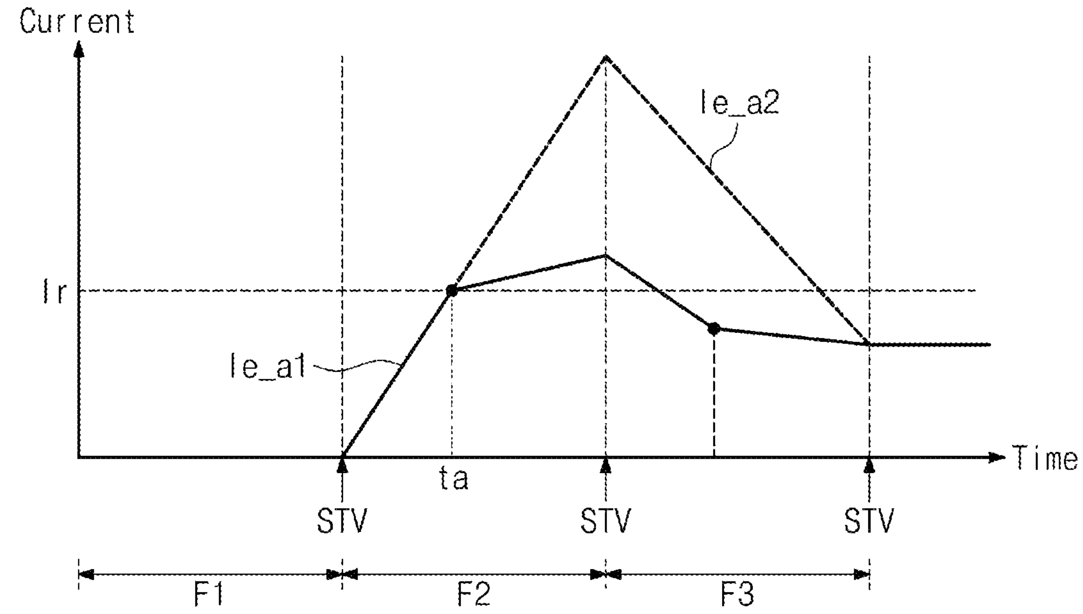
FIG. 10B illustrates a change in a driving current, when the data driving voltage and the initialization voltage change at the first time point according to an embodiment of the inventive concept.

FIGS. 9A to 9C respectively illustrate images displayed on a display panel during first to third frames according to an embodiment of the inventive concept. FIG. 10A illustrates a case where a data driving voltage and an initialization voltage change at a first time point according to an embodiment of the inventive concept. FIG. 10B illustrates a change in a driving current, when the data driving voltage and the initialization voltage change at the first time point according to an embodiment of the inventive concept.

Referring to FIGS. 9A to 9C, an image of black grayscale may be displayed on the display panel DP during a first frame F1. Then, the black grayscale image may change to a white grayscale image. A second frame F2 may be a start frame in which the load LD (see FIG. 6) is changed, and may be an uncompensated frame to which the current compensation operation by the current compensation block 110 is not reflected. A third frame F3 may be a compensated frame to which the current compensation operation by the current compensation block 110 is reflected. During the third frame F3, the image compensated with a grayscale lower than the white grayscale by the current compensation operation may be displayed on the display panel DP.

Referring to FIGS. 9A to 9C, 10A and 10B, a data voltage Vd having a black voltage level Vb corresponding to the black grayscale may be provided to the display panel DP during the first frame F1. Then, the data voltage Vd may be changed to a white voltage level $V_W$ corresponding to the white grayscale on the basis of the start time point t0 of the second frame F2. Due to an increase of the data voltage Vd, the driving current Ie of the display panel DP also increases on the basis of the start time point t0 of the second frame F2. In other words, the driving current Ie of the display panel DP begins to increase at the start time point t0 of the second frame F2.

The protection signal PS (see FIG. 7) may be activated at a first time point ta at which the driving current Ie exceeds the preset reference current Ir. As an example of the inventive concept, the first time ta may be between the second reference time t2 and the third reference time t3. In this case, the first reference level Vr1 of the data driving voltage AVDD may be reduced to the third compensation level Vc13, and the third reference level Vr3 of the initialization voltage VINT may be increased to the 15th compensation level Vc33. When the first reference level Vr1 of the data driving voltage AVDD is reduced to the third compensation level Vc13, the voltage level of the data voltage Vd may be reduced from the white voltage level $V_W$ to the first compensation level Vc1.

When the voltage level of the data voltage Vd is reduced to the first compensation voltage level Vc1 and the voltage level of the initialization voltage VINT is increased to the 15th compensation level Vc33, the driving current Ie of the display panel DP may be reduced.

In FIG. 10B, a first graph Ie_a1 indicates the driving current Ie during the first to third frames F1 to F3 when the voltage control block 500 is enabled, and a second graph Ie_a2 indicates the driving current Ie during the first to third frames F1 to F3 when the voltage control block 500 is not enabled.

When the voltage control block 500 is not enabled, the driving current Ie continuously increases at a previous slope even after the first time point ta at which the driving current Ie exceeds the reference current Ir. However, when the voltage control block 500 is enabled, the slope of the increase of the driving current Ie is reduced from the first time point ta. Accordingly, the display panel DP is prevented from being damaged (e.g., burnt) due to the increase in the driving current Ie.

Figure 11A:
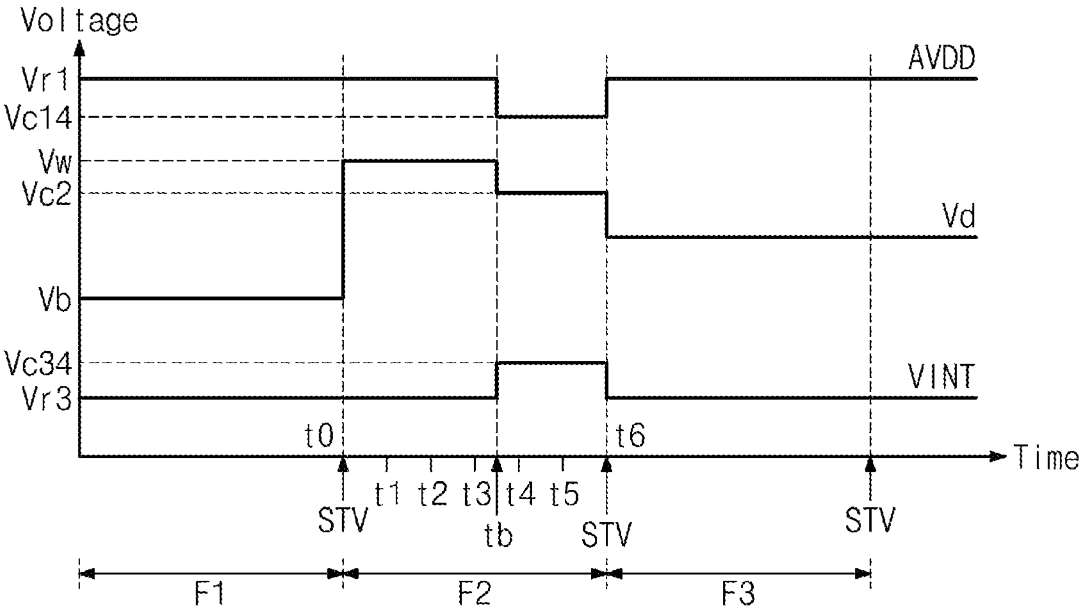
FIG. 11A illustrates a case where a data driving voltage and an initialization voltage change at a second time point according to an embodiment of the inventive concept.
Figure 11B:
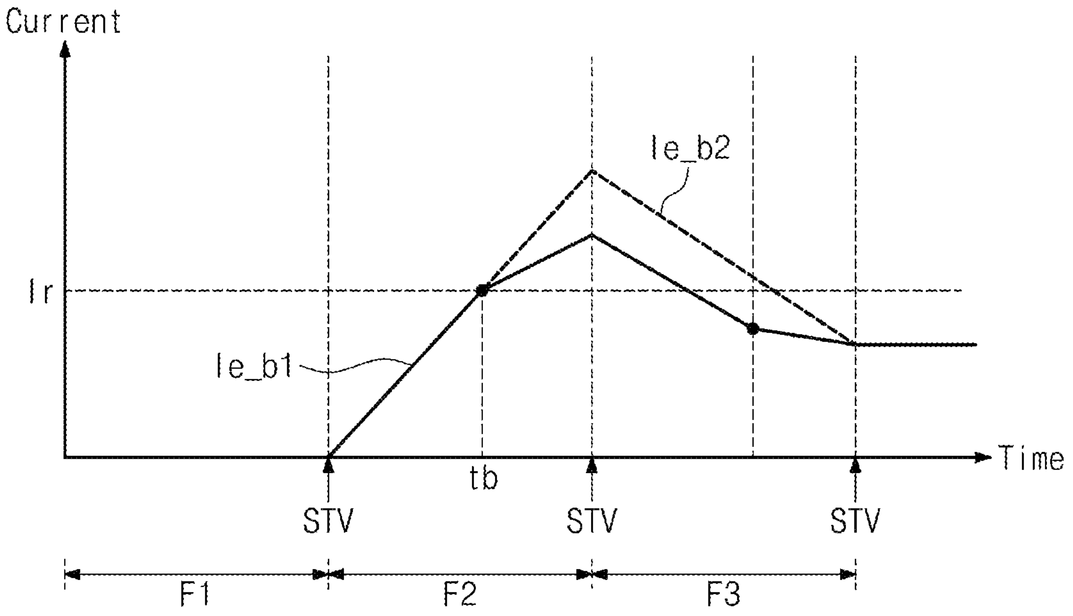
FIG. 11B illustrates a change in a driving current, when the data driving voltage and the initialization voltage change at the second time point according to an embodiment of the inventive concept.

FIG. 11A illustrates a case where the data driving voltage and the initialization voltage change at a second time point according to an embodiment of the inventive concept. FIG. 11B illustrates a change in a driving current, when the data driving voltage and the initialization voltage change at the second time point according to an embodiment of the inventive concept.

Referring to FIGS. 11A and 11B, the protection signal PS (see FIG. 7) may be activated at a second time point tb at which the driving current Ie exceeds the preset reference current Ir. As an example of the inventive concept, the second time tb may be between a third reference time t3 and a fourth reference time t4. In this case, the first reference level Vr1 of the data driving voltage AVDD may be reduced to the fourth compensation level Vc14, and the third reference level Vr3 of the initialization voltage VINT may be increased to the 16th compensation level Vc34. When the first reference level Vr1 of the data driving voltage AVDD is reduced to the fourth compensation level Vc14, the voltage level of the data voltage Vd may be reduced from the white voltage level $V_W$ to the second compensation level Vc2.

When the voltage level of the data voltage Vd is reduced to the second compensation voltage level Vc2 and the voltage level of the initialization voltage VINT is increased to the 16th compensation level Vc34, the driving current Ie of the display panel DP may be reduced.

In FIG. 11B, a third graph Ie_b1 indicates the driving current Ie during the first to third frames F1 to F3 when the voltage control block 500 is enabled, and a fourth graph Ie_b2 indicates the driving current Ie during the first to third frames F1 to F3 when the voltage control block 500 is not enabled.

When the voltage control block 500 is not enabled, the driving current Ie continuously increases at a previous slope even after the second time point tb at which the driving current Ie exceeds the reference current Ir. However, when the voltage control block 500 is enabled, the slope of the increase of the driving current Ie is reduced from the second time point tb. Accordingly, the display panel is prevented from being damaged (e.g., burnt) due to the increase in the driving current Ie.

According to embodiments of the inventive concept, at least one of the data driving voltage or the gamma reference voltage may be adjusted in an uncompensated frame to which the current compensation operation is not reflected, and thus, the driving current of the display panel may be prevented from abnormally increasing. As a result, damage to the display panel, which may occur due to the increase in driving current, may be prevented.

While the present inventive concept has been described with reference to embodiments thereof, it will be clear to those of ordinary skill in the art to that various changes and modifications may be made to the described embodiments without departing from the spirit and technical area of the inventive concept as set forth in the appended claims and their equivalents.

What is claimed is:

1. A display device, comprising:

a display panel comprising a pixel configured to receive a driving voltage and a data voltage;

a current compensation circuit configured to execute a current compensation operation in which a load is calculated based on input image data, and output compensation image data is generated by compensating for the input image data based on the load;

a data driver configured to convert the compensation image data into the data voltage based on a gamma reference voltage and a data driving voltage, and output the data voltage to the display panel;

a current sensing circuit configured to sense a driving current of the display panel and compare the driving current with a preset reference current to output a protection signal;

a voltage generator circuit configured to generate the driving voltage, the gamma reference voltage, and the data driving voltage; and a voltage control circuit configured to generate a first voltage control signal for controlling a first target compensation value of at least one of the gamma reference voltage and the data driving voltage in response to the protection signal, and provide the first voltage control signal to the voltage generator circuits, wherein the display panel displays an image for each frame of a plurality of frames, and the plurality of frames comprises an uncompensated frame, the uncompensated frame being a frame in which the current compensation operation has not yet been applied.

2. The display device of claim 1, wherein the voltage control circuit receives a start information signal comprising information about a start time point of the uncompensated frame, and adjusts the first target compensation value according to a time interval between the start time point of the uncompensated frame and a time point at which the protection signal is generated.

3. The display device of claim 2, further comprising:

a memory configured to store first voltage compensation values respectively corresponding to a plurality of periods that are obtained by dividing the uncompensated frame, wherein the voltage control circuit obtains, from the memory, a first voltage compensation value of a period to which the time interval belongs among the plurality of periods as the first target compensation value.

4. The electronic device of claim 3, wherein the first voltage compensation values decrease from a period in which the time interval from the start time point of the uncompensated frame is small to a period in which the time interval from the start time point of the uncompensated frame is large.

5. The display device of claim 1, wherein the pixel comprises:

a light emitting element;

a first transistor connected between a voltage line through which the driving voltage is supplied and the light emitting element, and comprising a gate electrode controlled by the data voltage; and a second transistor connected between a data line through which the data voltage is supplied and the gate electrode of the first transistor, and comprising a gate electrode configured to receive a first scan signal.

6. The display device of claim 5, wherein the pixel further comprises a third transistor connected between an initialization voltage line through which an initialization voltage is supplied and the light emitting element, and comprising a gate electrode configured to receive a second scan signal.

7. The display device of claim 1, wherein the data driver comprises:

a gamma voltage generation circuit configured to receive the gamma reference voltage to output a plurality of gamma voltages; and a data conversion circuit configured to receive the data driving voltage and the plurality of gamma voltages, and convert the compensation image data into the data voltage based on the plurality of gamma voltages.

8. The display device of claim 1, wherein the current compensation circuit comprises:

a load computation circuit configured to compute a load based on the input image data;

a current control circuit configured to select a target current based on the load, and output a target load corresponding to the target current; and a compensation circuit configured to compensate for the input image data based on the target load to output the compensation image data.

9. The display device of claim 8, wherein the current compensation circuit further comprises a target current storage circuit in which target currents according to magnitudes of the load are stored.

10. A display device, comprising:

a display panel comprising a pixel configured to receive a driving voltage and a data voltage;

a current compensation circuit configured to execute a current compensation operation in which a load is calculated based on input image data, and output compensation image data is generated by compensating for the input image data based on the load;

a data driver configured to convert the compensation image data into the data voltage based on a gamma reference voltage and a data driving voltage, and output the data voltage to the display panel;

a current sensing circuit configured to sense a driving current of the display panel and compare the driving current with a preset reference current to output a protection signal;

a voltage generator circuit configured to generate the driving voltage, the gamma reference voltage, and the data driving voltage; and a voltage control circuit configured to generate a first voltage control signal for controlling a first target compensation value of at least one of the gamma reference voltage and the data driving voltage in response to the protection signal, and provide the first voltage control signal to the voltage generator circuit, wherein the pixel comprises:

a light emitting element;

a first transistor connected between a voltage line through which the driving voltage is supplied and the light emitting element, and comprising a gate electrode controlled by the data voltage;

a second transistor connected between a data line through which the data voltage is supplied and the gate electrode of the first transistor, and comprising a gate electrode configured to receive a first scan signal; and a third transistor connected between an initialization voltage line through which an initialization voltage is supplied and the light emitting element, and comprising a gate electrode configured to receive a second scan signal, wherein the voltage generator circuit generates the initialization voltage, and the voltage control circuit generates a second voltage control signal for controlling a second target compensation value of the initialization voltage in response to the protection signal, and provides the second voltage control signal to the voltage generator circuit.

11. The display device of claim 10, wherein the voltage control circuit receives a start information signal comprising information about a start time point of the uncompensated frame, and adjusts the first and second target compensation values according to a time interval between the start time point of the uncompensated frame and a time point at which the protection signal is generated.

12. The display device of claim 11, further comprising:

a memory configured to store first voltage compensation values and second voltage compensation values respectively corresponding to a plurality of periods that are obtained by dividing the uncompensated frame, wherein the voltage control circuit obtains, from the memory, a first voltage compensation value of a period to which the time interval belongs among the plurality of periods as the first target compensation value, and obtains, from the memory, a second voltage compensation value of a period to which the time interval belongs among the plurality of periods as the second target compensation value.

13. The display device of claim 12, wherein the memory stores the first voltage compensation values that decrease from a period in which the time interval from the start time point of the uncompensated frame is small to a period in which the time interval from the start time point of the uncompensated frame is large, and the second voltage compensation values that increase from the period in which the time interval from the start time point of the uncompensated frame is small to the period in which the time interval from the start time point of the uncompensated frame is large.

14. The display device of claim 11, further comprising:

a scan driver configured to output the first and second scan signals in response to a start signal and a clock signal, wherein the start signal is provided to the voltage control circuit as the start information signal.

15. The display device of claim 10, wherein the voltage generator circuit comprises:

a driving voltage generation circuit configured to generate the driving voltage;

a data driving voltage generation circuit configured to generate the data driving voltage;

a gamma reference voltage generation circuit configured to generate the gamma reference voltage; and an initialization voltage generation circuit configured to generate the initialization voltage.

16. The display device of claim 15, wherein the voltage control circuit provides the first voltage control signal to at least one of the data driving voltage generation circuit and the gamma reference voltage generation circuit, and provides the second voltage control signal to the initialization voltage generation circuit.

17. The display device of claim 16, wherein at least one of the data driving voltage generation circuit and the gamma reference voltage generation circuit reduces a voltage level of one of the data driving voltage and the gamma reference voltage in response to the first voltage control signal, and the initialization voltage generation circuit increases a voltage level of the initialization voltage in response to the second voltage control signal.

18. The display device of claim 15, further comprising:

a switching circuit disposed between the voltage control circuit and the voltage generator circuit, wherein the switching circuit is activated by a switch enable signal to transfer the first and second voltage control signals to the voltage generator circuit.

19. The display device of claim 18, wherein the switching circuit comprises:

a first switching circuit disposed between the voltage control circuit and the data driving voltage generation circuit;

a second switching circuit disposed between the voltage control circuit and the gamma reference voltage generation circuit; and a third switching circuit disposed between the voltage control circuit and the initialization voltage generation circuit.

* * * * *